United States Patent
Murata et al.

(10) Patent No.: US 11,159,060 B2
(45) Date of Patent: Oct. 26, 2021

(54) WIRELESS POWER-SUPPLY CONTROL APPARATUS, POWER TRANSMITTER, AND POWER RECEIVER

(71) Applicant: KABUSHIKI KAISHA TOSHIBA, Tokyo (JP)

(72) Inventors: Kentaro Murata, Tokyo (JP); Kohei Onizuka, Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 685 days.

(21) Appl. No.: 15/700,535

(22) Filed: Sep. 11, 2017

(65) Prior Publication Data
US 2018/0254671 A1    Sep. 6, 2018

(30) Foreign Application Priority Data
Mar. 1, 2017   (JP) .............................. JP2017-038791

(51) Int. Cl.
*H02J 50/40*  (2016.01)
*H02J 7/02*   (2016.01)
(Continued)

(52) U.S. Cl.
CPC .............. *H02J 50/40* (2016.02); *H02J 7/025* (2013.01); *H02J 50/20* (2016.02); *H04B 5/0037* (2013.01); *H04W 52/04* (2013.01); *H04W 52/42* (2013.01)

(58) Field of Classification Search
CPC .. H02J 50/20; H02J 50/40; H02J 50/80; H02J 7/025; H04B 5/0037; H04B 52/04; H04W 52/42
(Continued)

(56) References Cited

U.S. PATENT DOCUMENTS 9,553,473 B2    1/2017 Zeine et al.
2007/0041464 A1 *  2/2007 Kim .......................... H04L 1/06
                                                                  375/267
(Continued)

FOREIGN PATENT DOCUMENTS

JP    2004-032879    1/2004
JP    2016-512677    4/2016
(Continued)

OTHER PUBLICATIONS

English-language machine translation of JP 2004-032879.

*Primary Examiner* — Daniel Kessie
*Assistant Examiner* — Brian K Baxter
(74) *Attorney, Agent, or Firm* — Nixon & Vanderhye, P.C.

(57) ABSTRACT

A wireless power-supply control apparatus to perform control on transmission of power from at least one power transmitter comprising a plurality of first antennas to a plurality of power receivers, has a first communicator and a controller. The first communicator to receive propagation path information between the power transmitter and the plurality of power receivers and requested-power information on requested power of the plurality of power receivers, from the power transmitter or the plurality of power receivers. The controller to control power to be transmitted from the power transmitter to a predetermined value and control at least either one of a phase or an amplitude of power to be supplied to the plurality of first antennas, based on the propagation path information and the requested-power information, so that a specific number of power receivers receiving power larger than the requested power is equal to or larger than a predetermined number.

14 Claims, 23 Drawing Sheets

(51) Int. Cl.
*H04B 5/00* (2006.01)
*H04W 52/04* (2009.01)
*H04W 52/42* (2009.01)
*H02J 50/20* (2016.01)

(58) Field of Classification Search
USPC .......................................................... 307/104
See application file for complete search history.

(56) References Cited

U.S. PATENT DOCUMENTS

| | | | |
|---|---|---|---|
| 2008/0076407 A1* | 3/2008 | Shitara | H04W 52/247 |
| | | | 455/424 |
| 2013/0063083 A1* | 3/2013 | Park | H02J 7/0013 |
| | | | 320/108 |
| 2014/0217967 A1 | 8/2014 | Zeine et al. | |
| 2014/0333144 A1* | 11/2014 | Ikeuchi | H02J 5/005 |
| | | | 307/104 |
| 2015/0091706 A1* | 4/2015 | Chemishkian | H02J 50/20 |
| | | | 340/10.34 |
| 2015/0229133 A1 | 8/2015 | Reynolds et al. | |
| 2015/0303710 A1* | 10/2015 | John | H02J 5/005 |
| | | | 307/104 |
| 2017/0063167 A1* | 3/2017 | Uchida | H02J 50/12 |
| 2017/0063168 A1 | 3/2017 | Uchida | |
| 2017/0085127 A1* | 3/2017 | Leabman | H02J 7/025 |
| 2017/0110910 A1* | 4/2017 | Zeine | H02J 50/80 |
| 2018/0084406 A1* | 3/2018 | Tandai | H04W 28/0215 |
| 2018/0145518 A1* | 5/2018 | Onizuka | H02M 3/1584 |
| 2018/0183259 A1* | 6/2018 | Lee | H04B 1/3838 |
| 2018/0226839 A1* | 8/2018 | Higaki | H02J 50/20 |

FOREIGN PATENT DOCUMENTS

| | | |
|---|---|---|
| JP | 2018-125815 | 8/2018 |
| WO | 2015/177859 | 11/2015 |
| WO | 2017/004335 | 1/2017 |

\* cited by examiner

WIRELESS POWER-SUPPLY CONTROL APPARATUS, POWER TRANSMITTER, AND POWER RECEIVER

CROSS REFERENCE TO RELATED APPLICATIONS

This application is based upon and claims the benefit of priority from the prior Japanese Patent Application No. 2017-38791, filed on Mar. 1, 2017, the entire contents of which are incorporated herein by reference.

FIELD

Embodiments relate to a wireless power-supply control apparatus, a power transmitter, and a power receiver.

BACKGROUND

A technique is proposed to receive power requests from a plurality of power receivers and transmit, in time division, a wireless power in accordance with the requests from a power transmitter to the plurality of power receivers.

In the technique, power supply to the plurality of power receivers is performed per specific time while changing directivity or the like of the power transmitter and switching in time the target power receiver to be supplied with power. However, although the power can be efficiently supplied to the target power receiver at a certain time, the power may not to be supplied enough to the other power receivers. Moreover, part of wireless power radiated from the power transmitter is scattered in an unnecessary direction and hence not effectively used, resulting in that entire system power supply efficiency is lowered.

As discussed above, it cannot be said that appropriate power supply control is performed in a known system to perform wireless power supply from the power transmitter to the power receivers.

DETAILED DESCRIPTION

According to one embodiment, a wireless power-supply control apparatus to perform control on transmission of power from at least one power transmitter comprising a plurality of first antennas to a plurality of power receivers, has a first communicator and a controller. The first communicator to receive propagation path information between the power transmitter and the plurality of power receivers and requested-power information on requested power of the plurality of power receivers, from the power transmitter or the plurality of power receivers. The controller to control power to be transmitted from the power transmitter to a predetermined value and control at least either one of a phase or an amplitude of power to be supplied to the plurality of first antennas, based on the propagation path information and the requested-power information, so that a specific number of power receivers receiving power larger than the requested power is equal to or larger than a predetermined number.

Hereinafter, the embodiments of the present invention will be explained with reference to the drawings.

First Embodiment

Figure 1:
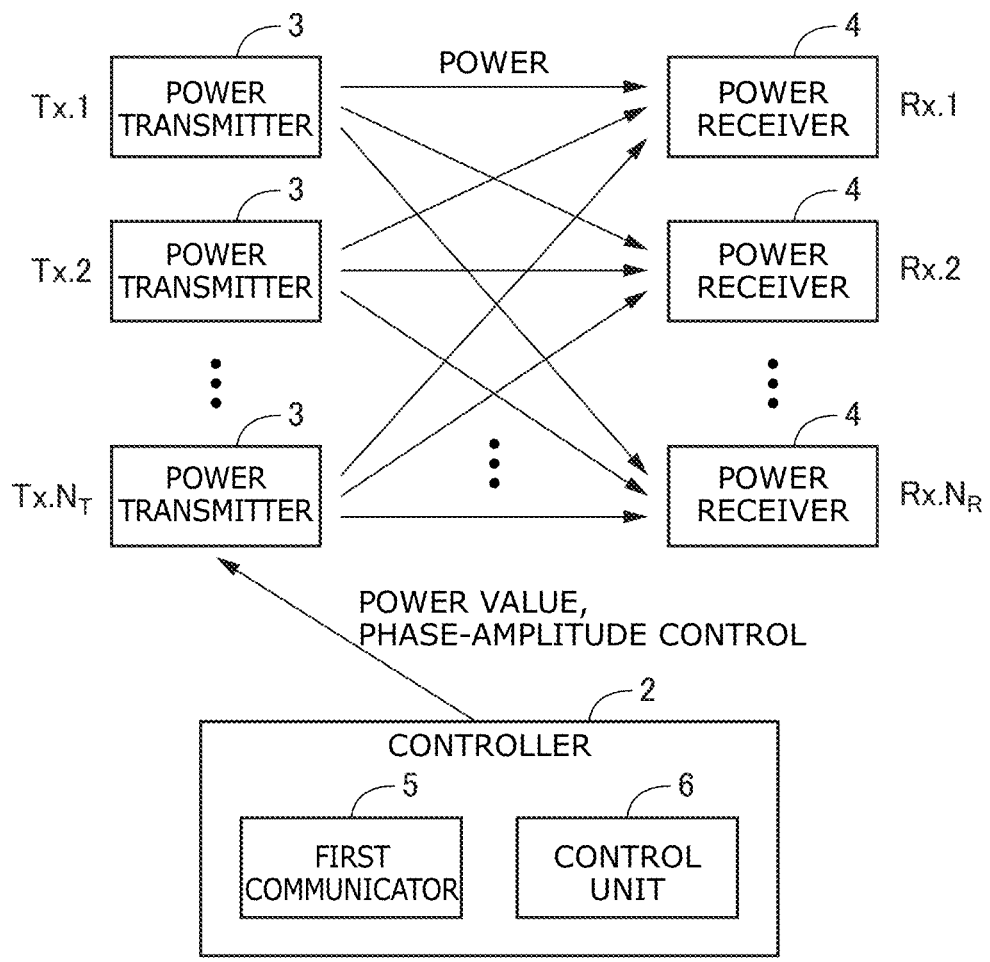
FIG. 1 is a block diagram schematically showing the configuration of a wireless power supply system according to a first embodiment.

FIG. 1 is a block diagram schematically showing the configuration of a wireless power supply system 1 according to a first embodiment. The wireless power supply system 1 of FIG. 1 is provided with a wireless power-supply control apparatus (hereinafter, referred to as a controller) 2, at least one power transmitter 3, and a plurality of power receivers 4. Although there are a plurality of power transmitters 3 in FIG. 1, as long as there is at least one power transmitter 3, there is no particular limitation on the number of power transmitters 3. Concerning the power receivers 4, as long as there are at least two power receivers 4, there is no particular limitation on the number of power receivers 4.

The power transmitter 3 has a plurality of first antennas. The power transmitter 3 transmits power wirelessly to the plurality of power receivers 4 via the plurality of first antennas. The communication path between the power transmitter 3 and the controller 2, and the communication path between the power receivers 4 and the controller 2 may be wireless or wired communication paths. The technique to establish the connection between the communication paths is not limited to any particular one. The connection may be established via the Internet, for example.

FIG. 1 shows an example in which a plurality of power transmitters 3 are provided and each power transmitter 3 has one first antenna. However, a single power transmitter 3 may have a plurality of first antennas. Each of the plurality of power transmitters 3 may have one or more first antennas. Each of the plurality of power receivers 4 receives power transmitted from the plurality of first antennas at the power transmitter 3 side.

The plurality of first antennas transmit electromagnetic waves or sound waves. The plurality of power receivers 4 receive transmitted power included in the electromagnetic waves or the sound waves. The electromagnetic waves or the sound waves may be transmitted and received in any frequency band between the plurality of first antennas and the plurality of power receivers 4, for example, in a frequency band of 100 MHz or higher for the electromagnetic waves or a frequency band from 16 kHz to 20 kHz for the sound waves. In this specification, the electromagnetic waves or the sound waves used in power transmission is also referred to as power waves.

The controller 2 has a first communicator 5 and a control unit 6. The first communicator 5 receives information on propagation paths between the power transmitter 3 and the plurality of power receivers 4, from the power transmitter 3 or the plurality of power receivers 4. Moreover, the first communicator 5 receives information on requested power required by the plurality of power receivers 4, from the plurality of power receivers 4. Based on the propagation path information and requested-power information, the control unit 6 controls the power to be transmitted from the power transmitter 3 to a predetermined value and also controls at least either one of phase and amplitude of power to be supplied to the plurality of first antennas so that transmitted power exceeds the requested power of the plurality of power receivers 4 simultaneously.

In the above-described control, based on the propagation path information, if it is determined that it is impossible to supply power, which exceeds the requested power, to some power receivers 4, these power receivers 4 may be removed, in advance, from the targets to be under the above-described control. Moreover, as a result of control, if there are power receivers 4, which receive power smaller than the requested power, the power supply may be continued, or these power receivers 4 may be removed from the targets to be under the above-described control and then the control may be performed with recalculation. In these cases, based on the propagation path information and the requested-power information, the control unit 6 may perform control of the power to be transmitted from the power transmitter 3 to a predetermined value and control of at least either one of the phase and the amplitude of power supplied to the plurality of first antennas so that the number of power receivers 4, which receive power that exceeds the requested power, becomes equal to or larger than a predetermined number. The predetermined number is a total number of power receivers 4 that remain after removing the power receivers 4, which may receive power smaller than the requested power for some reasons, from the plurality of power receivers 4.

The power transmitter 3 or the plurality of power receivers 4 have a function of estimating the propagation path information between the power transmitter 3 and the plurality of power receivers 4. The internal configurations of the power transmitter 3 and the plurality of power receivers 4 depend on which of the power transmitter 3 and the plurality of power receivers 4 estimate the propagation path information.

Figure 2:
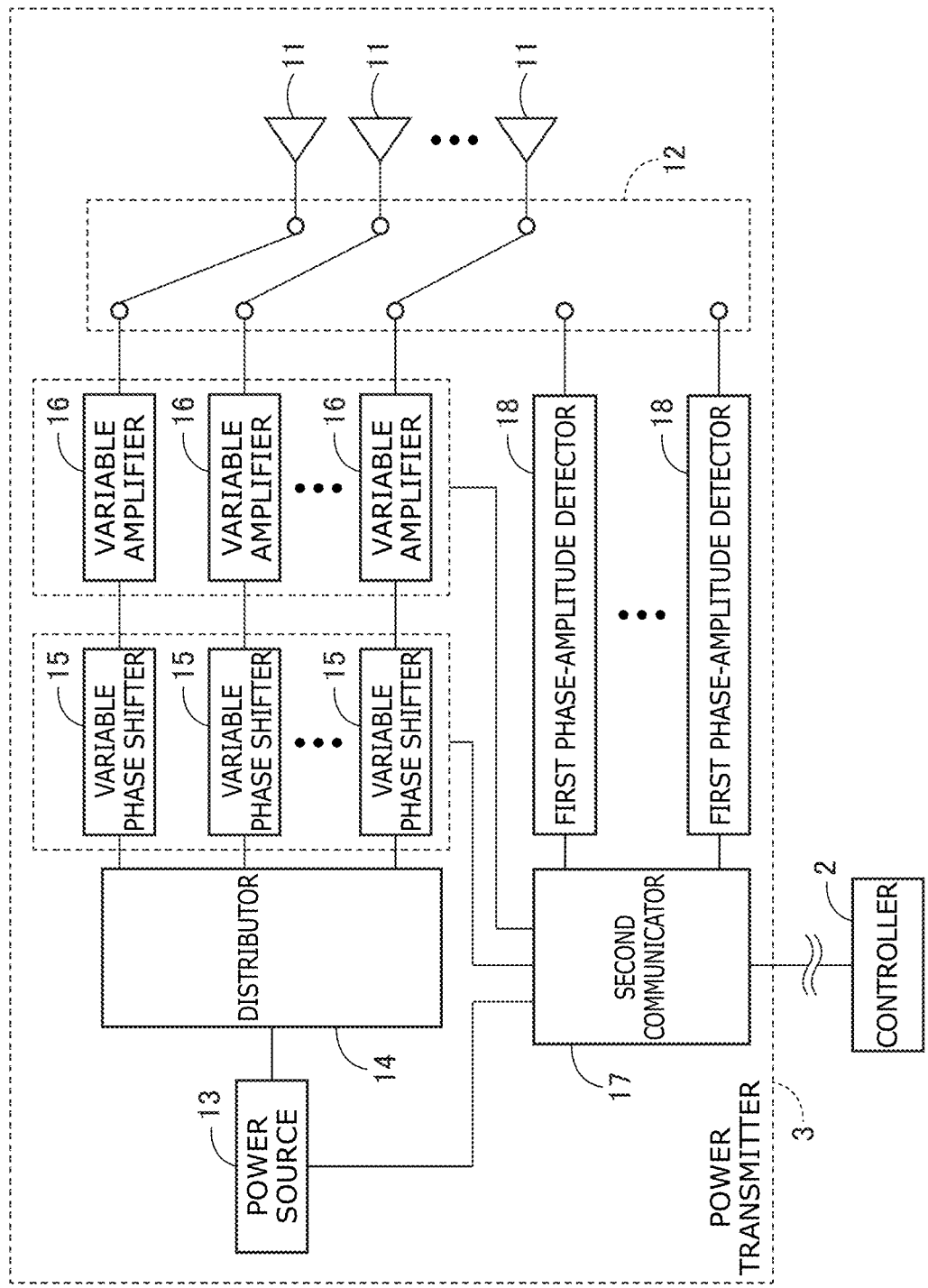
FIG. 2 is a block diagram showing a first example of the internal configuration of a power transmitter.

FIG. 2 is a block diagram showing a first example of the internal configuration of the power transmitter 3. The power transmitter 3 of FIG. 2 has a function of estimating the propagation path information. The power transmitter 3 of FIG. 2 has a plurality of first antennas 11, a first switch 12, a power source 13, a distributor 14, a plurality of variable phase shifters 15, a plurality of variable amplifiers 16, a second communicator 17, and a plurality of first phase-amplitude detectors 18.

The variable phase shifters 15, the variable amplifiers 16, and the first phase-amplitude detectors 18 are associated with the plurality of first antennas 11, respectively.

The first switch 12 is provided to switch between transmission and reception at the plurality of first antennas 11. An isolator may be used instead of the first switch 12.

The components inside the power transmitter 3 of FIG. 2 are divided into a power transmission section and a propagation-path information estimation section. The power transmission section in the power transmitter 3 of FIG. 2 has the plurality of first antennas 11, the first switch 12, the power source 13, the distributor 14, the plurality of variable phase shifters 15, and the plurality of variable amplifiers 16. The power source 13 sets a power value to be transmitted under an instruction from the controller 2. The distributor 14 distributes the power to be transmitted, output from the power source 13, toward the plurality of first antennas 11 so that the power receivers 4 receive the powers that exceed the requested powers required by the power receivers 4. The plurality of variable phase shifters 15 set the phase of the distributed power under an instruction from the controller 2. The plurality of variable amplifiers 16 set amplitudes of the distributed power under an instruction from the controller 2.

The propagation-path information estimation section in the power transmitter 3 of FIG. 2 has the plurality of first antennas 11, the first switch 12, the plurality of first phase-amplitude detectors 18, and the second communicator 17. The plurality of first phase-amplitude detectors 18 receive pilot signals (reference signals) transmitted by any of the power receivers 4, via the plurality of first antennas 11 and the first switch 12, to estimate propagation path information on the phase and amplitude of a propagation path along which each pilot signal is transmitted. The propagation path information estimated by each of the plurality of first phase-amplitude detectors 18 is transmitted to the controller 2 via the second communicator 17.

Based on the propagation path information from the power transmitter 3, the controller 2 controls the power value to be transmitted from the power transmitter 3 and also controls at least either one of the phase and the amplitude of power to be transmitted after distributed, to output control signals which are then transmitted to the transmitter 3. Based on the control signals from the controller 2, as described above, in the power transmitter 3, the power source 13 sets the power value to be transmitted, the plurality of variable phase shifters 15 set the phases of the distributed power, and the plurality of variable amplifiers 16 set the amplitudes of the distributed power.

Figure 3:
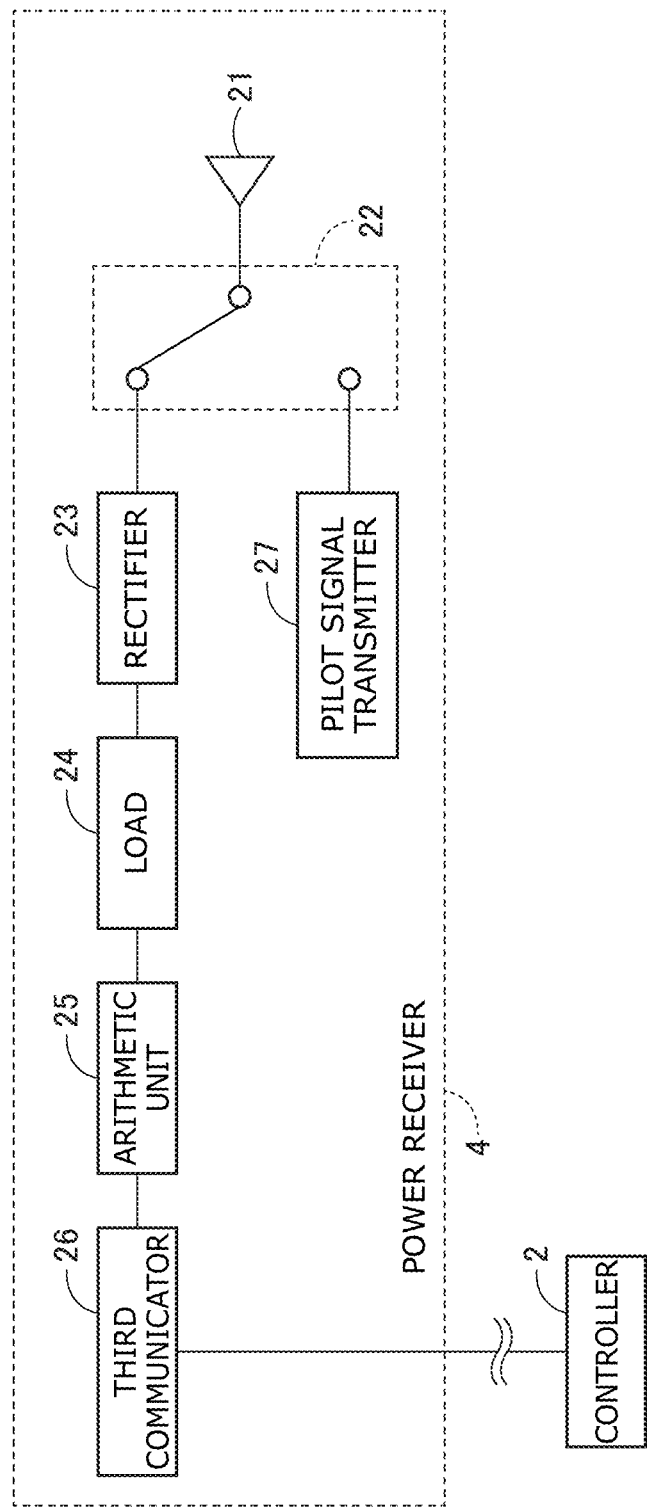
FIG. 3 is a block diagram showing a first example of the internal configuration of a power receiver.

FIG. 3 is a block diagram showing a first example of the internal configuration of each of the plurality of power receivers 4. The power receiver 4 of FIG. 3 has a function of transmitting a pilot signal to the power transmitter 3. The power receiver 4 of FIG. 3 has a second antenna 21, a second switch 22, a rectifier 23, a load 24, an arithmetic unit 25, a third communicator 26, and a pilot signal transmitter 27. The second antenna 21 receives the power transmitted from the power transmitter 3 and transmits the pilot signal generated by the pilot signal transmitter 27 to the power transmitter 3. The second switch 22 switches between transmission and reception at the second antenna 21. The rectifier 23 converts the received power into a direct current power and charges the load 24 with the direct current power. The load 24 is configured with a storage battery, a capacitor, a super capacitor, etc. The arithmetic unit 25 calculates requested power required by the power receiver 4 based on the state of the load 24, for example, remaining charge or consumed power. Information on the requested power is transmitted to the controller 2 via the third communicator 26.

Figure 4:
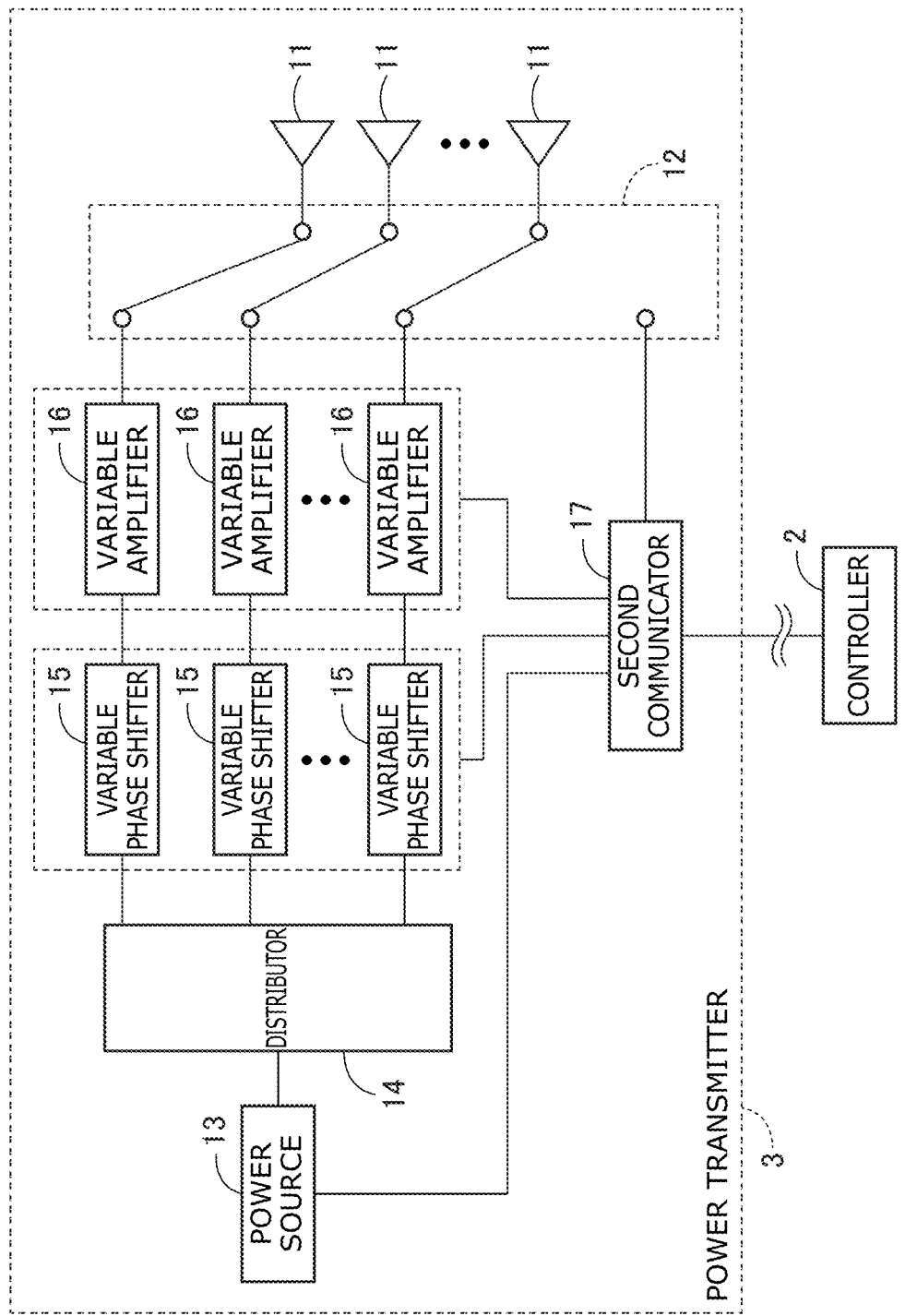
FIG. 4 is a block diagram showing a second example of the internal configuration of the power transmitter.

FIG. 4 is a block diagram showing a second example of the internal configuration of the power transmitter 3. The power transmitter 3 of FIG. 4 has no first phase-amplitude detectors 18 shown in FIG. 2. The second communicator 17 switches the first antennas 11 to be connected one by one and transmits a pilot signal for propagation-path information estimation to the plurality of power receivers 4 via the switched first antennas 11. The configuration and operation of the power transmission section in the power transmitter 3 of FIG. 4 are the same as those explained with reference to FIG. 2.

Figure 5:
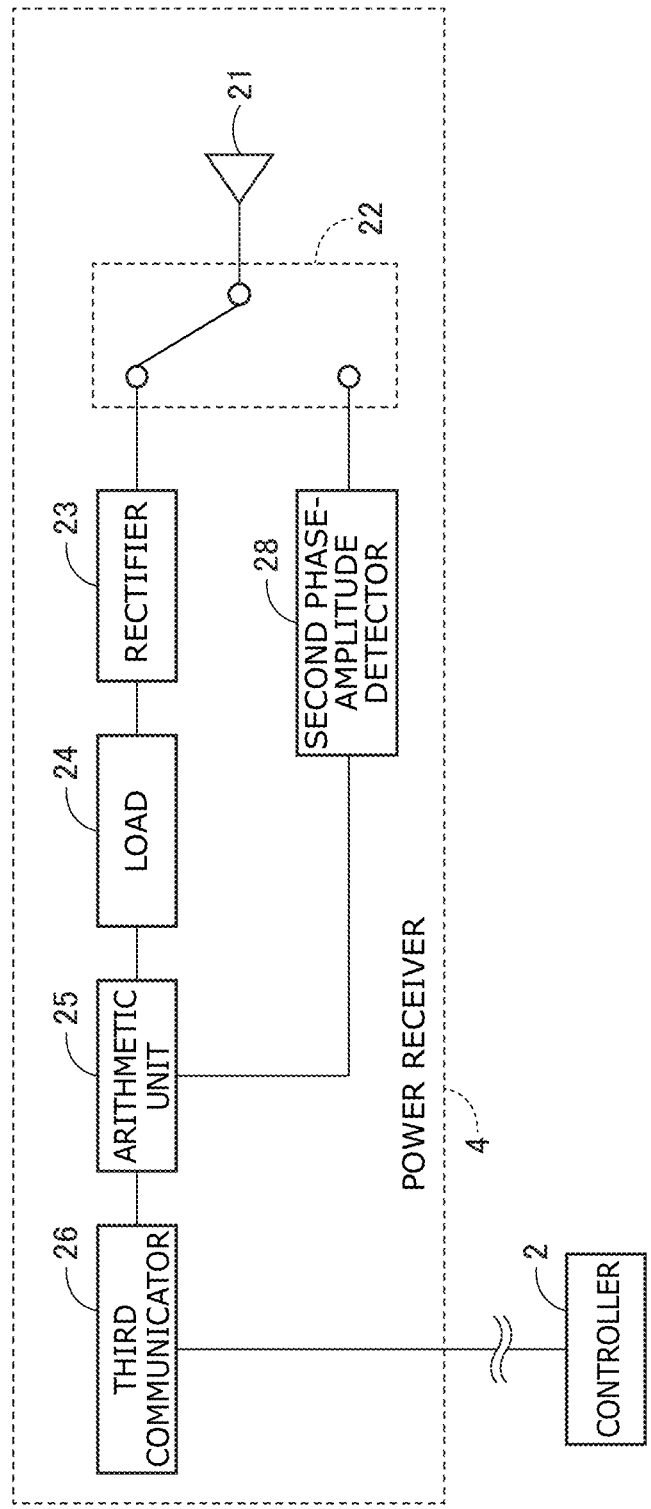
FIG. 5 is a block diagram showing a second example of the internal configuration of the power receiver.

FIG. 5 is a block diagram showing a second example of the internal configuration of each of the plurality of power receivers 4. The power receiver 4 of FIG. 5 has no pilot signal transmitter 27 shown in FIG. 3 but has a second phase-amplitude detector 28. The second phase-amplitude detectors 28 estimates propagation path information based on the pilot signal that is transmitted from the power transmitter 3 and is received at the second antenna 21. The estimated propagation path information is transmitted to the controller 2 via the third communicator 26.

Figure 6:
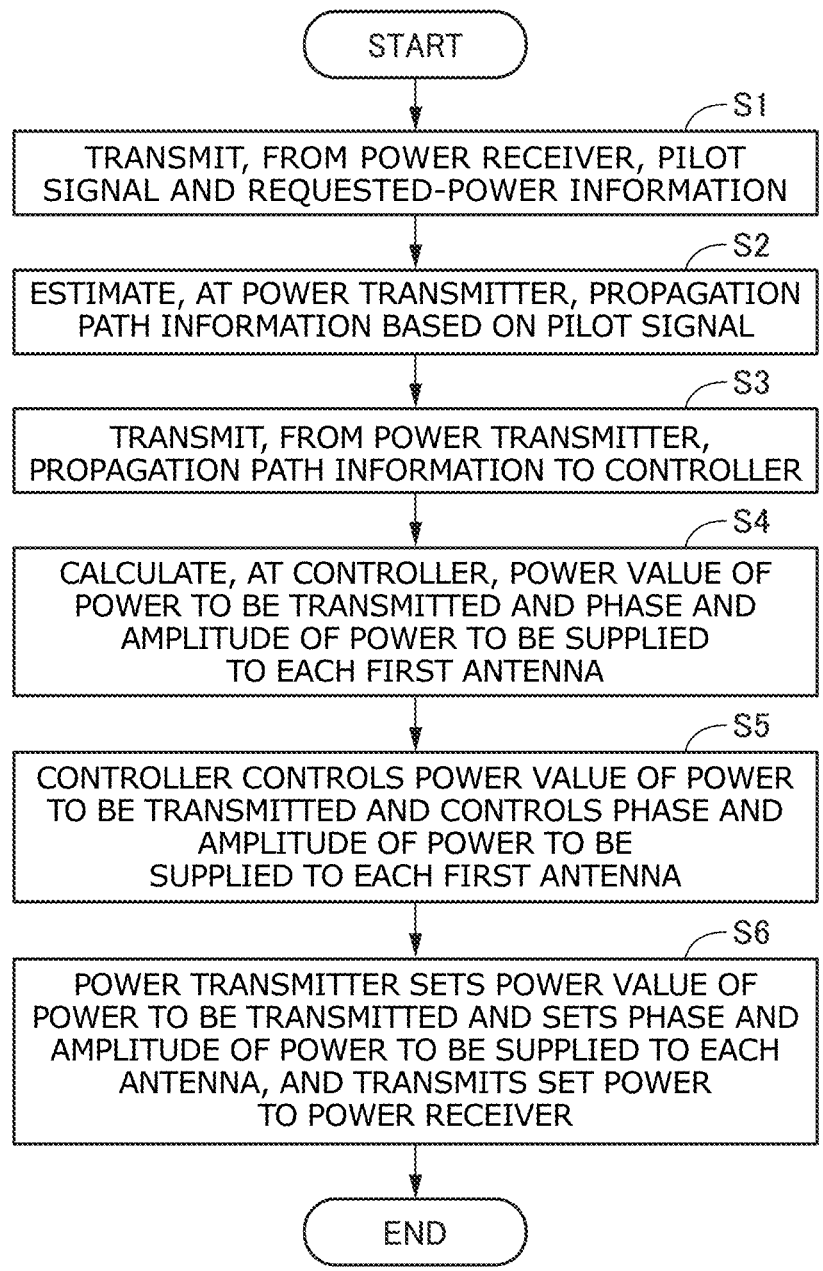
FIG. 6 is a flowchart showing a process of power transmission with propagation-path information estimation between the power transmitter of FIG. 2 and the power receiver of FIG. 3.
Figure 7A:
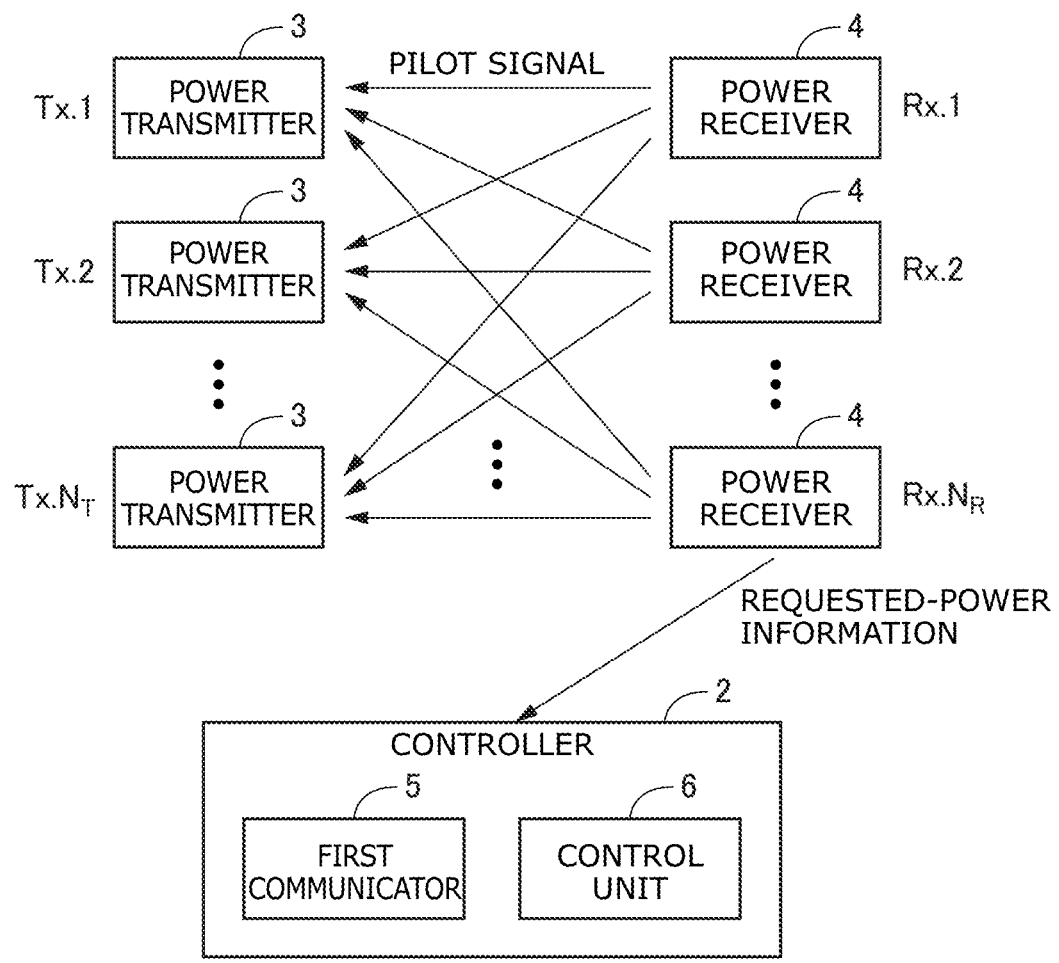
FIG. 7A is a drawing showing flows of signals and power transmitted and received among power transmitters and power receivers in each step of FIG. 6.
Figure 7B:
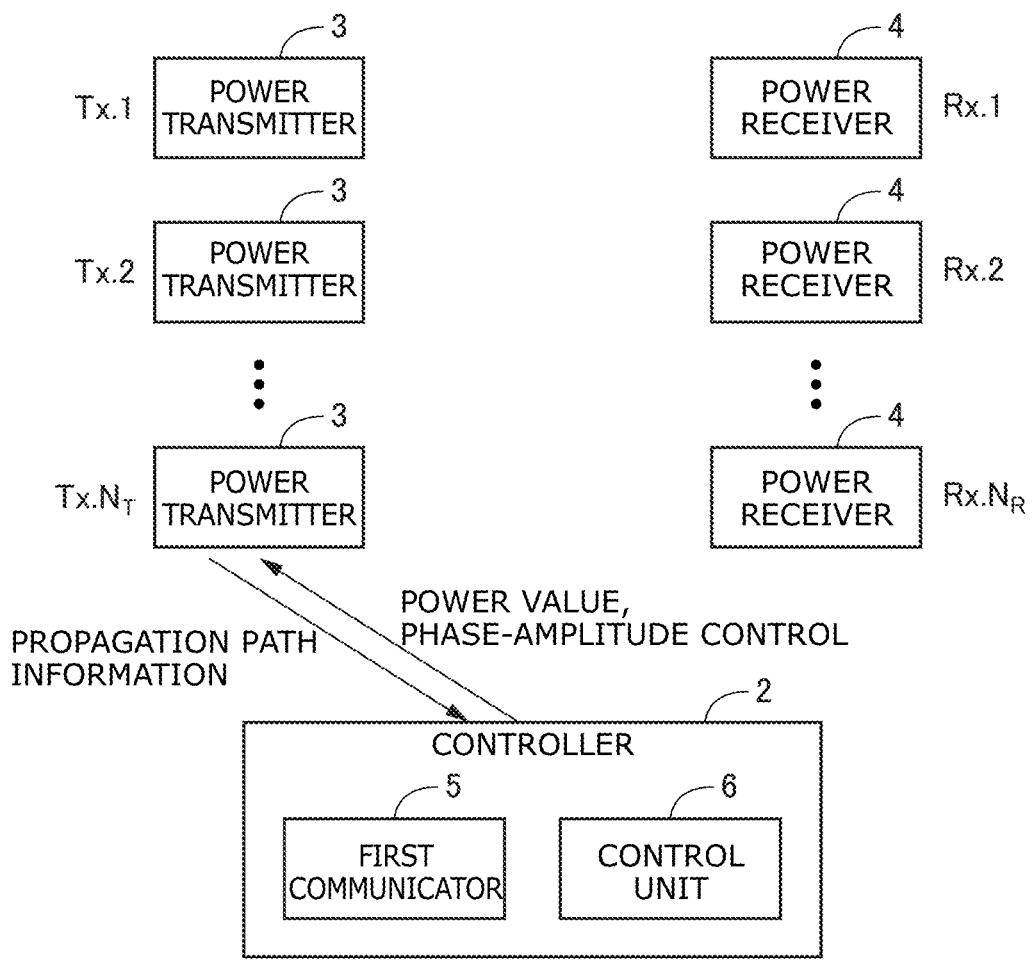
FIG. 7B is a drawing showing flows of signals and power transmitted and received among the power transmitters and the power receivers in each step of FIG. 6.
Figure 7C:
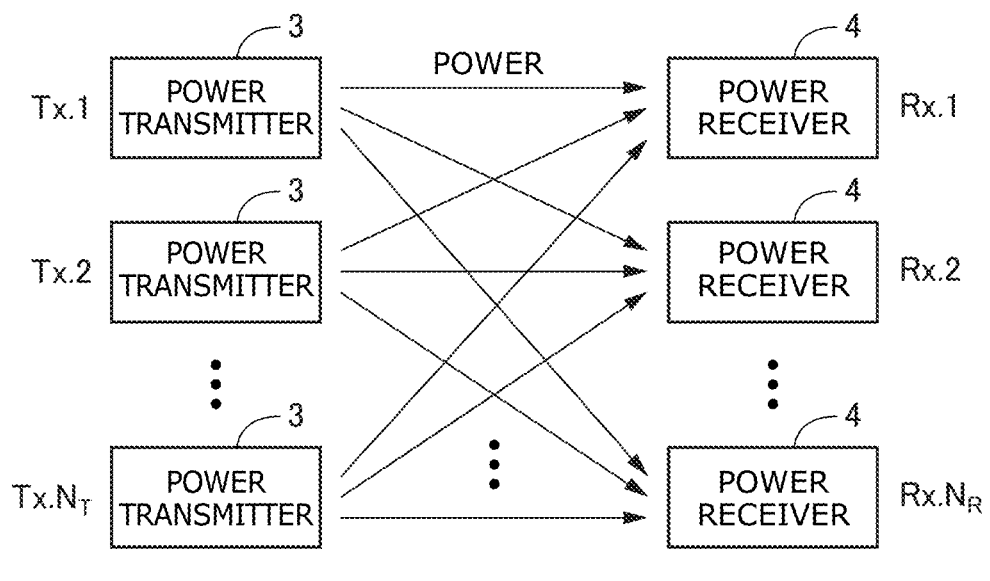
FIG. 7C is a drawing showing flows of signals and power transmitted and received among the power transmitters and the power receivers in each step of FIG. 6.
Figure 7C:
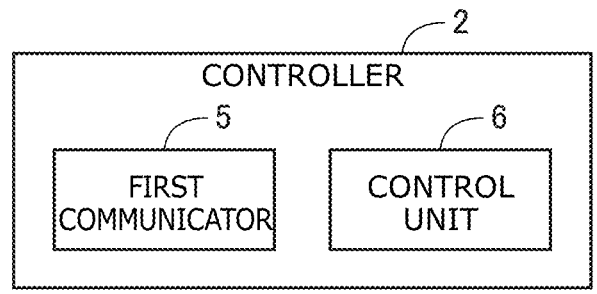

FIG. 6 is a flowchart showing a process of power transmission with propagation-path information estimation between the power transmitter 3 of FIG. 2 and the power receiver 4 of FIG. 3. The flowchart of FIG. 6 shows processes of the controller 2, the power transmitter 3, and the power receiver 4, in chronological order. FIGS. 7A to 7C are diagrams with arrows that indicate transmission and reception of signals, power, etc., among the power transmitter 3, the power receiver 4, and the controller 2, when steps in FIG. 6 are performed.

First of all, each power receiver 4 transmits the pilot signal and then the transmitted pilot signal is received by the power transmitter 3. The plurality of power receivers 4 transmit the requested-power information to the controller 2 (step S1, FIG. 7A). Subsequently, based on the pilot signal, the power transmitter 3 estimates the propagation path information (step S2). Subsequently, the power transmitter 3 transmits the propagation path information to the controller 2 (step S3, FIG. 7B). Based on the propagation path information and the requested-power information from each power receiver 4, the controller 2 calculates the power value to be transmitted and also calculates the phase and amplitude of power to be supplied to each of the plurality of first antennas 11 (step S4, FIG. 7B). Moreover, the controller 2 controls the power value to be transmitted and transmits, to the power transmitter 3, a control signal for controlling at least either one of the phase and amplitude of power to be supplied to each first antenna 11 (step S5). Based on the control signal from the controller 2, the power transmitter 3 sets the power value to be transmitted and also sets at least either one of the phase and amplitude of distributed power to be transmitted, and then supplies the set power to each of the plurality of first antennas 11 and transmits the set power toward the associated power receiver 4 (step S6, FIG. 7C).

Figure 8:
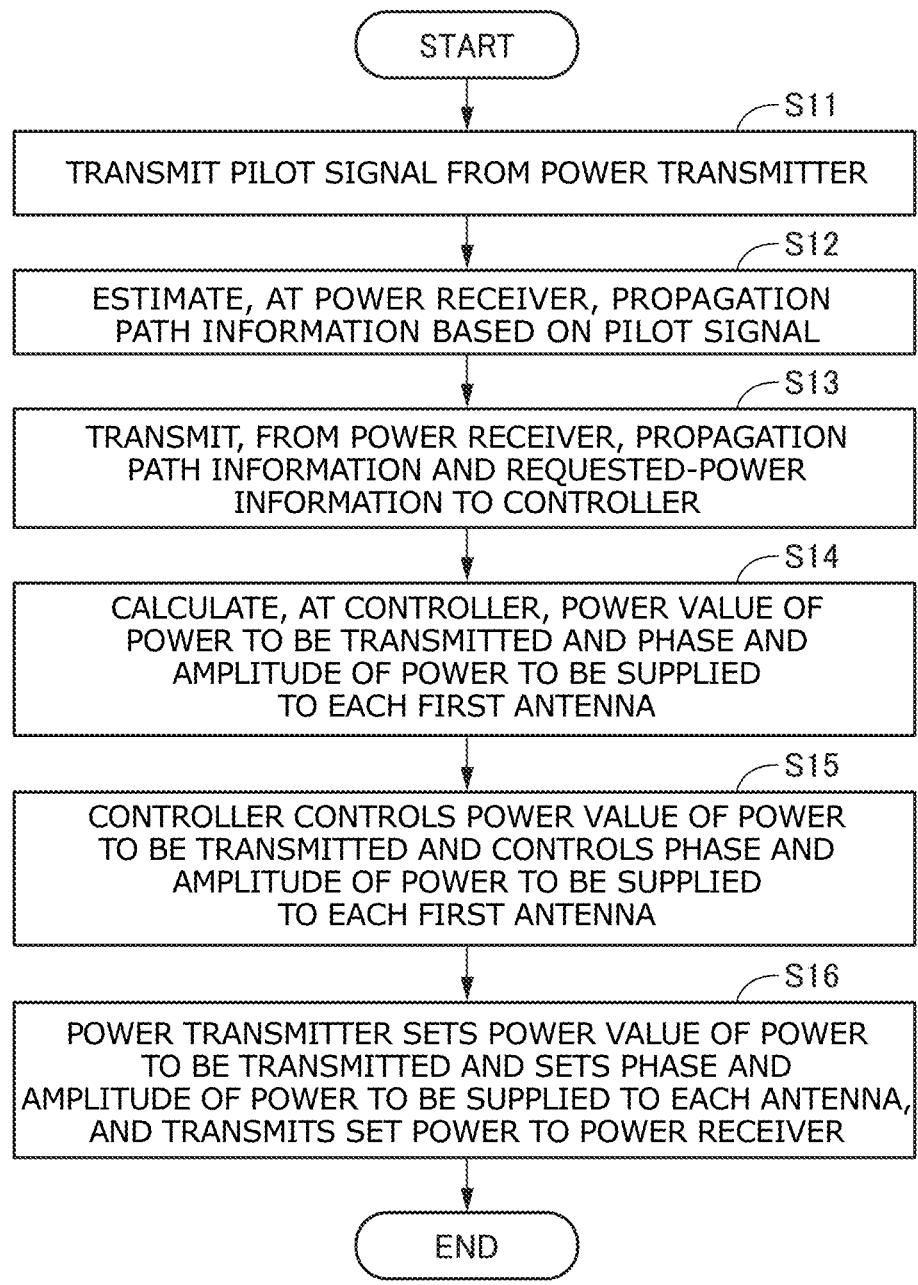
FIG. 8 is a flowchart showing a process of power transmission with propagation-path information estimation between the power transmitter 3 of FIG. 4 and the power receiver 4 of FIG. 5.
Figure 9A:
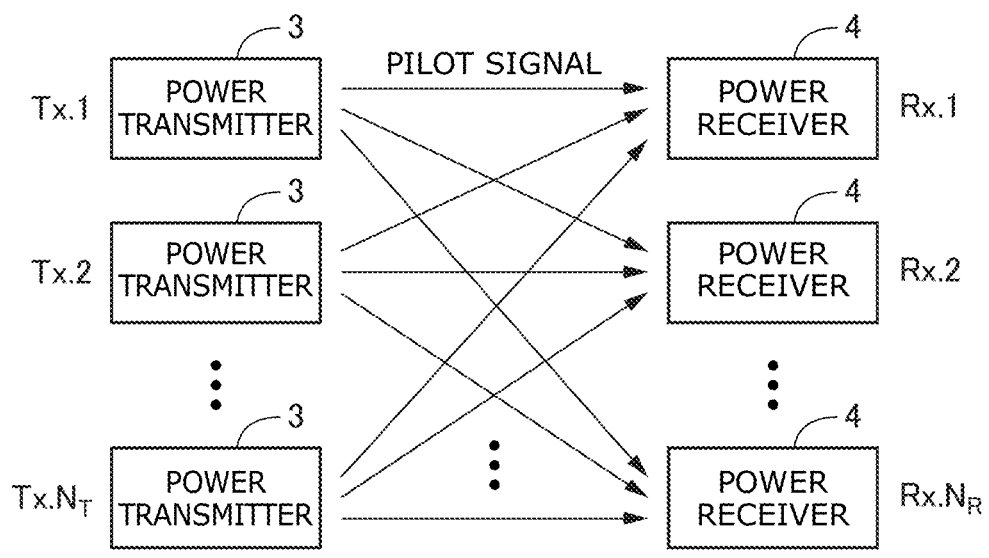
FIG. 9A is a drawing showing flows of signals and power transmitted and received among the power transmitters and the power receivers in each step of FIG. 8.
Figure 9A:
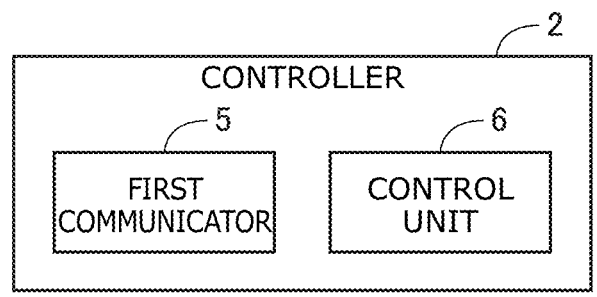
Figure 9B:
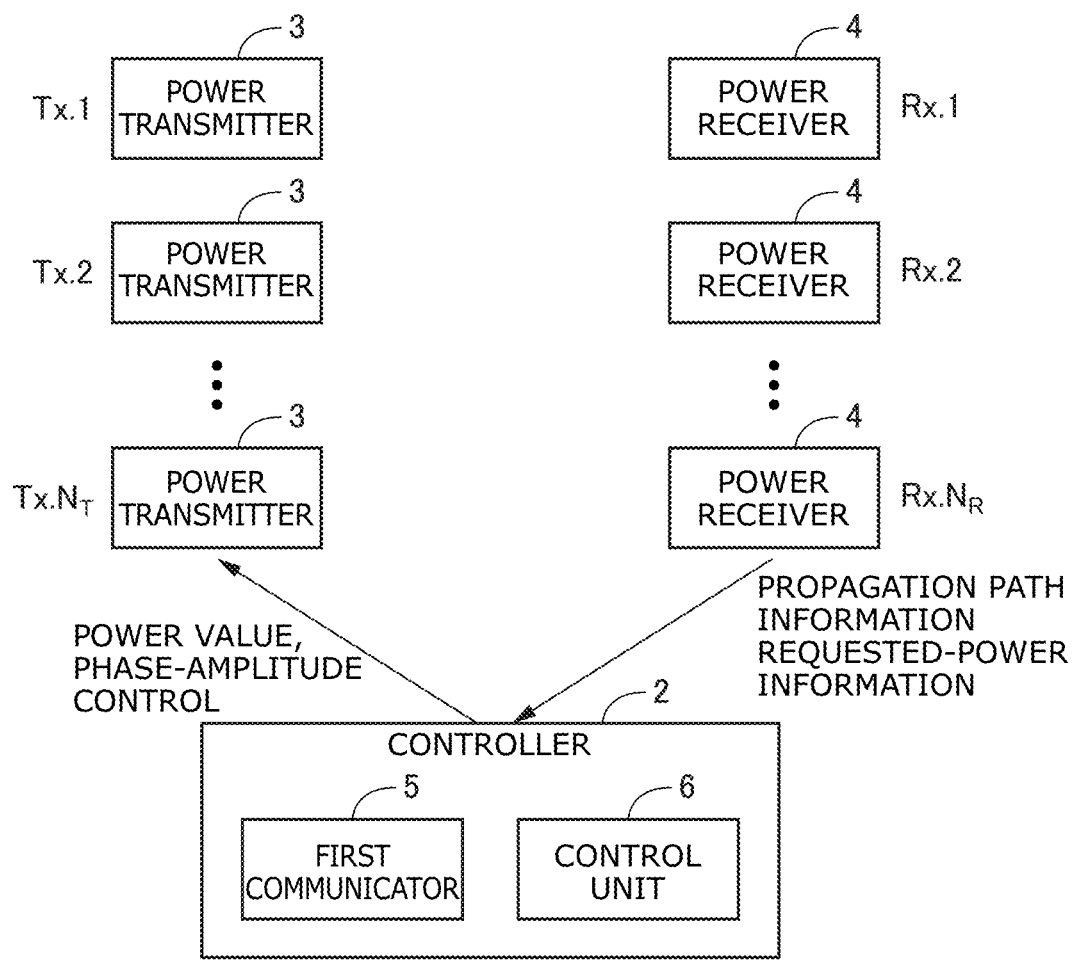
FIG. 9B is a drawing showing flows of signals and power transmitted and received among the power transmitters and the power receivers in each step of FIG. 8.
Figure 9C:
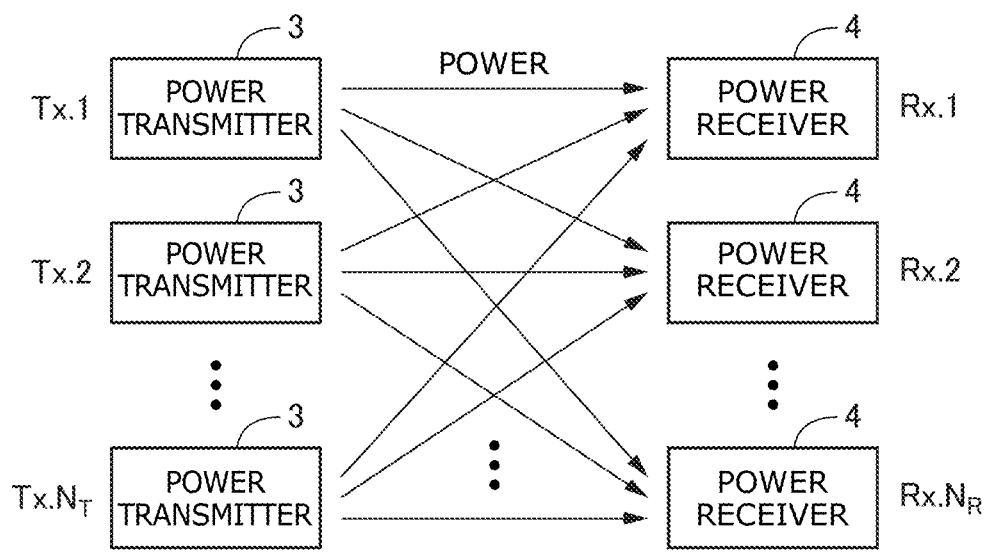
FIG. 9C is a drawing showing flows of signals and power transmitted and received among the power transmitters and the power receivers in each step of FIG. 6.
Figure 9C:
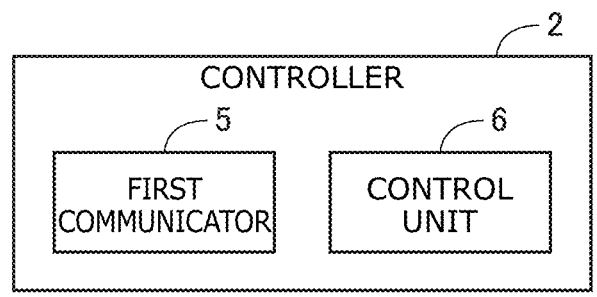

FIG. 8 is a flowchart showing a process of power transmission with propagation-path information estimation between the power transmitter 3 of FIG. 4 and the power receiver 4 of FIG. 5. FIGS. 9A to 9C are diagrams with arrows that indicate transmission and reception of signals, power, etc., among the power transmitter 3, the power receiver 4, and the controller 2, when steps in FIG. 8 are performed.

First of all, the power transmitter 3 transmits the pilot signal and then the transmitted pilot signal is received by the plurality of power receivers 4 (step S11, FIG. 9A). Subsequently, based on the pilot signal, each power receiver 4 estimates the propagation path information (step S12). Subsequently, each power receiver 4 transmits the propagation path information and the requested-power information to the controller 2 (step S13, FIG. 9B). Thereafter, the same processes as in steps S4 to S6 are performed (steps S14 to S16, FIG. 9C).

Figure 10:
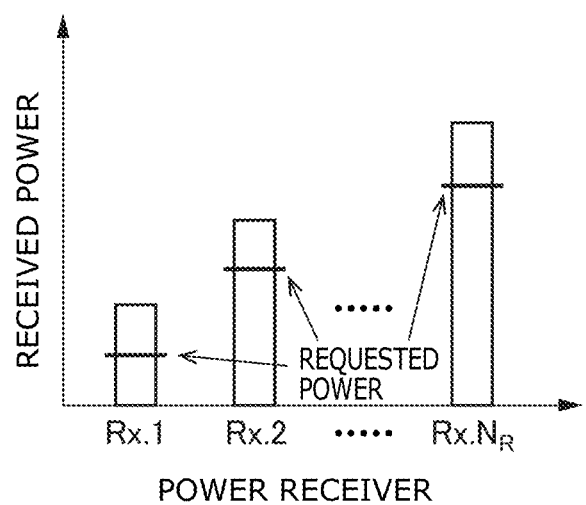
FIG. 10 is a drawing that conceptually shows a control policy of a controller according to the first embodiment.

FIG. 10 is a drawing that conceptually shows a control policy of the controller 2 according to the first embodiment. As shown in FIG. 10, the controller 2 according to the first embodiment controls the power to be transmitted by the power transmitter 3 to a predetermined value and also controls at least either one of the phase and amplitude of power to be supplied to each first antenna 11 of the power transmitter 3 so as to acquire power to be received by the plurality of power receivers 4, which exceeds the requested power of the plurality of power receivers 4 simultaneously. The above control may be performed with a round-robin search to find out a combination, which exceeds the requested power of the plurality of power receivers 4 simultaneously, of the power to be transmitted by the power transmitter 3, the phase of power to be supplied to each first antenna 11, and the amplitude of power to be supplied to each first antenna 11. Or the above control may be performed with a round-robin search to find out a combination, which exceeds the requested power of the plurality of power receivers 4 simultaneously, of the phase and amplitude of power to be supplied to each first antenna 11, on condition that the power to be transmitted by the power transmitter 3 is set to a certain value.

Figure 11:
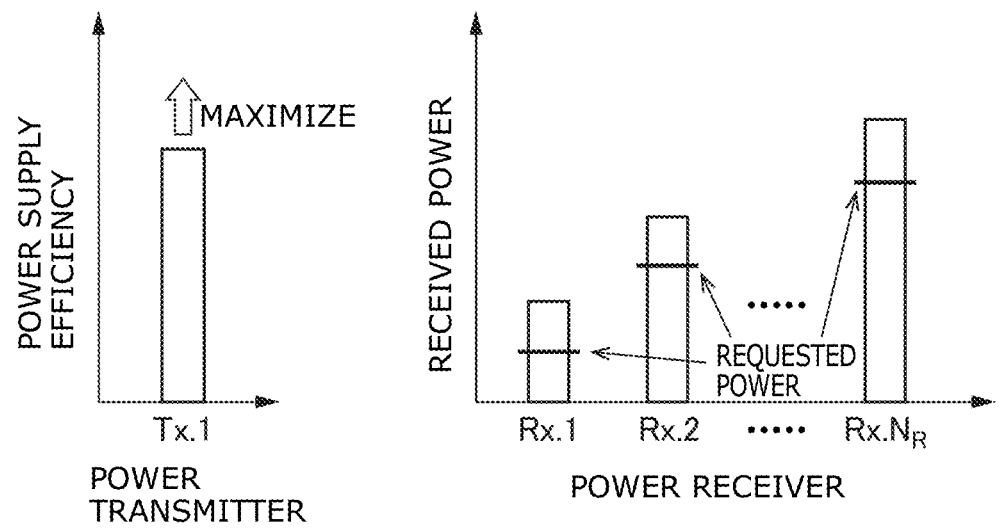
FIG. 11 is a drawing that specifically shows the control policy of the controller according to the first embodiment.

FIG. 11 is a drawing that shows more specifically the control policy of the controller 2 according to the first embodiment. As shown in FIG. 11, the controller 2 according to the first embodiment controls the power value to be transmitted by the power transmitter 3 and the phase and amplitude of power to be supplied to each first antenna 11 so that the power received by each power receiver 4 exceeds the requested power and a power supply efficiency of the entire wireless power supply system 1 becomes maximum. The reason for maximizing the power supply efficiency is power saving.

The power supply efficiency is expressed by a ratio of the total power received by the plurality of power receivers 4 to the total power transmitted by the power transmitter 3. The control unit 6 controls the power to be transmitted by the power transmitter 3 to a predetermined value and also controls at least either one of the phase and amplitude of power to be supplied to each of the plurality of first antennas 11 so that the above ratio becomes equal to or larger than a value obtained by dividing the maximum value of the ratio by the number of the plurality of power receivers 4, that is, the power supply efficiency becomes equal to or larger than a value obtained by dividing the maximum value of the power supply efficiency by the number of the plurality of power receivers 4. The reason for dividing the maximum value of the power supply efficiency from the power transmitter 3 by the number of the plurality of power receivers 4 is that it is difficult to accurately maximize the power supply efficiency. Even if it is tried to maximize the power supply efficiency, practically, the maximized power supply efficiency must be smaller than the maximum value. For this reason, having a lower limit value of the power supply efficiency, which is obtained by dividing the maximum value of the power supply efficiency by the number of the plurality of power receivers 4, the control unit 6 controls the power to be transmitted by the power transmitter 3 to the predetermined value and also controls at least either one of the phase and amplitude of power to be supplied to each of the plurality of first antennas 11 so that the power supply efficiency becomes equal to or smaller than the lower limit value. According to the control described above, power can be transmitted from the power transmitter 3 to the plurality of power receivers 4, with the power supply efficiency as high as possible.

The plurality of first antennas 11 of the power transmitter 3 according to the present embodiment can be configured with a phased array antenna having several ten to several hundred antennas (the first antennas 11) in view of improvements in gain and in variable directivity. In the case of the phased array antenna, it takes much time on calculation so as to control the power value to be transmitted and the phase and amplitude of power to be supplied to each first antenna 11, with a round-robin search to find out all combinations of the phase and amplitude by the number of antennas of phased array antenna, which is not efficient. For this reason, in the present embodiment, based on a previously estimated propagation path information, the power value to be transmitted to the predetermined value is set and also at least either one of the phase and amplitude of power to be supplied to each first antenna 11 is set.

In order to simplify the explanation, it is assumed to provide a wireless power supply system 1 configured with a single power transmitter 3 having an $N_T$ number of first antennas 11 and an $N_R$ number of power receivers 4. In practice, even if there are a plurality of power transmitters 3 in synchronism with one another, the plurality of power transmitters 3 can be regarded as a single power transmitter 3 having antennas, the number of which is the sum of the number of antennas of the plurality of power transmitters 3. Therefore, the following explanation is also applicable to a wireless power supply system 1 having a plurality of power transmitters 3.

A transmission path matrix between the $N_T$ number of antennas 11 of the power transmitter 3 to the $N_R$ number of power receivers 4 is defined as H. The transmission path matrix H is a complex matrix of $N_R$ rows and $N_T$ columns. A matrix component $h_{ij}$ of the i-th row and the j-th column expresses propagation path information between the j-th antenna of an array of the power transmitter 3 and the i-th power receiver 4, as shown in the following expression (1).

$$h_{ij} = ae^{j\theta} \quad (1)$$

In the expression (1), e denotes the Napier's constant, a denotes the amplitude of the propagation path discussed here, and θ denotes a phase of the propagation path discussed here. The transmission path matrix H is decomposed as shown in the following expression (2), with singular value decomposition.

$$H = U\Sigma V^H \quad (2)$$

In the expression (2), V and U denote the $N_T$-th complex matrix and the $N_R$-th complex matrix, respectively, and are transmission and reception orthonormal basis matrices, respectively, of the transmission path matrix H. The subscript H expresses the complex conjugate transpose of a matrix. The $N_T$-th complex matrix V has the $N_T$ number of column vectors, which is expressed as the following expression (3).

$$V = [v_1, v_2, \ldots v_{N_T}] \quad (3)$$

In the expression (3), $v_k$ denotes the k-th power transmission weight. The k-th element of each weight corresponds to the phase and amplitude set for the k-th first antenna 11 of the power transmitter 3. The sign Σ denotes a diagonal matrix having singular values of the transmission path matrix H as diagonal terms. The k-th singular value is expressed as $\sigma_k$ and the maximum singular value is defined as the first singular value. A squared singular value $\sigma_k$ corresponds to the entire-system power supply efficiency in the case where power supply is performed with the phase and amplitude of the power transmitter 3, both set based on the k-th weight $v_k$. Especially, when the first singular value σ1 is squared, this corresponds to the entire-system maximum power supply efficiency achieved in the state of the propagation path discussed here.

When the number of antennas $N_T$ of the power transmitter 3 is equal to or larger than the number $N_R$ of the power receivers 4 ($N_R \le N_T$), the transmission path matrix H can be decomposed by singular value decomposition as shown below.

$$H = U[\Delta O][V_\Delta V_O]^H \quad (4)$$

In the above expression, the matrix Δ is the $N_R$-order diagonal matrix including the $N_R$ number of singular values and the matrix O is a zero matrix of $N_R$ rows and ($N_T$-$N_R$)

columns. The block matrices $V_\Delta$ and $V_O$ are orthonormal basis matrices corresponding to the matrices $\Delta$ and $O$, respectively, having the $N_R$ and ($N_T$-$N_R$) number of weights, respectively. In conception, each weight corresponds to the directivity of a phased array antenna of the power transmitter 3, the directivity being different for each weight. Since each weight of the block matrix $V_\Delta$ corresponds a singular value of zero or larger (power supply efficiency $\geq 0$), the weights forms directivity contributing to power supply. In contrast, since each weight of the block matrix $V_O$ corresponds the null space (power supply efficiency=0), the weights forms directivity not contributing to power supply. Therefore, from the point of view of power supply, it is preferable that only the former weights are adopted as candidates for the combination of phase and amplitude set to the power transmitter 3, whereas the latter weights are removed from the candidates in advance.

As described above, based on the orthonormal basis matrices obtained by decomposing the transmission path matrix, the control unit 6 controls the power to be transmitted by the power transmitter 3 to the predetermined value and also controls at least either one of the phase and amplitude of the power to be supplied to each of the plurality of first antennas 11. In more specifically, based on the orthonormal bases contributing to power supply in the orthonormal basis matrices, the control unit 6 controls the power to be transmitted by the power transmitter 3 to the predetermined value and also controls at least either one of the phase and amplitude of the power to be supplied to each of the plurality of first antennas 11. In other words, based on the orthonormal bases remaining after removing the orthonormal bases not contributing to power supply in the orthonormal basis matrices, the control unit 6 controls the power to be transmitted by the power transmitter 3 to the predetermined value and also controls at least either one of the phase and amplitude of the power to be supplied to each of the plurality of first antennas 11.

Figure 12:
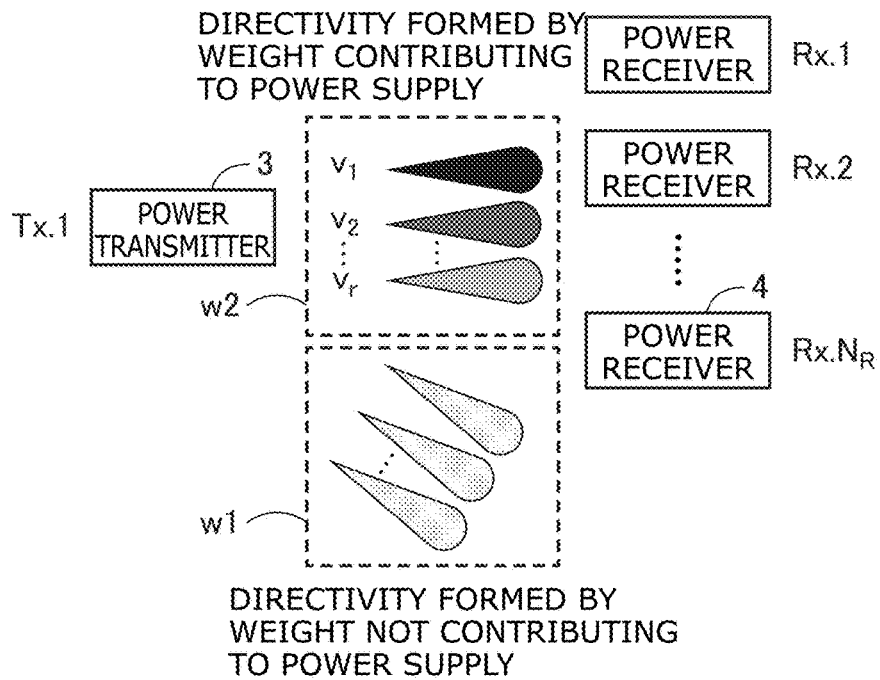
FIG. 12 a drawing schematically showing beam patterns of power waves transmitted from a plurality of first antennas of a power transmitter.
Figure 12:
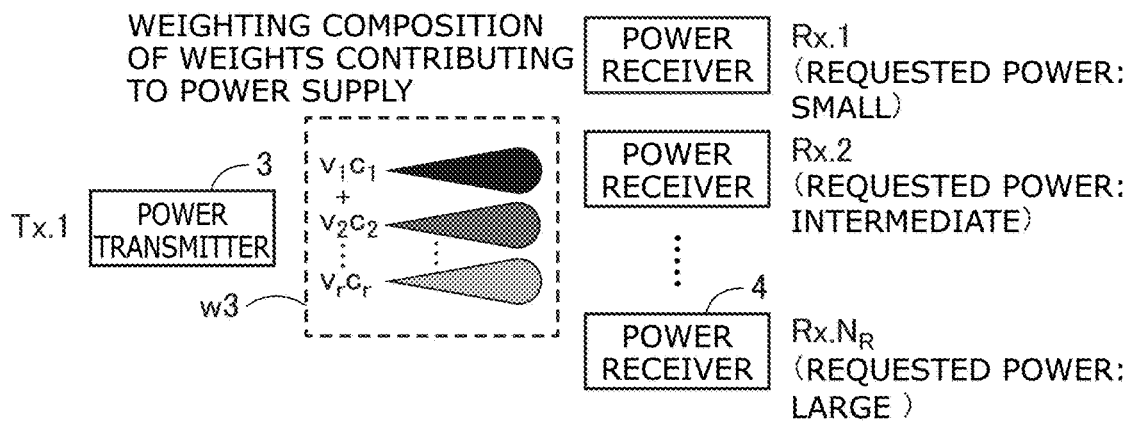
Figure 12:
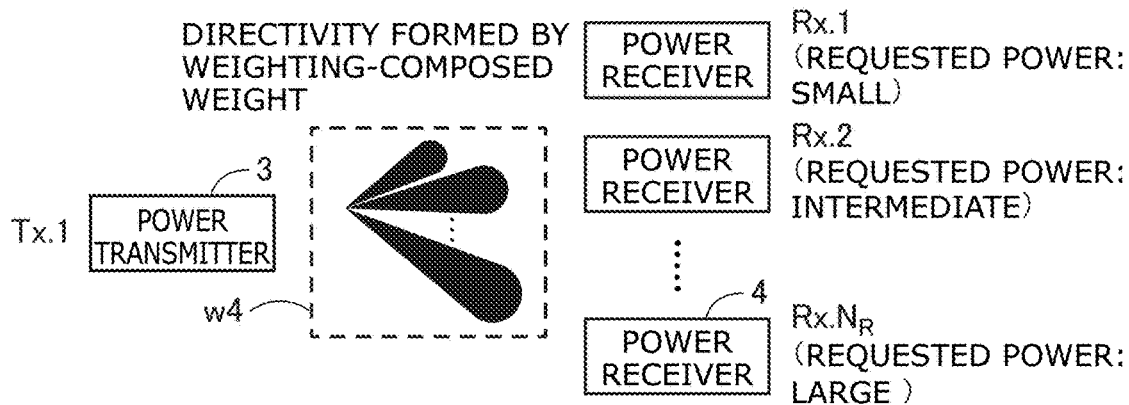

FIG. 12 a drawing schematically showing a beam pattern of a power wave transmitted from each of the plurality of first antennas 11 of the power transmitter 3. In the present embodiment, the weights not contributing to power supply are removed (a broken line w1), whereas the weights contributing to power supply are adopted (a broken line w2).

As a concrete example, a weight w to be applied to the power transmitter 3 is expressed by the following expression (5) with weighting composition of weights contributing to power supply among the weights in the block matrix $V_\Delta$ (a broken line frame w3 in FIG. 12).

$$w = v_1 c_1 + v_2 c_2 + \ldots v_r c_r = V_\Delta' c \tag{5}$$

in which r denotes the rank of the transmission path matrix H, having a relationship of $r \leq N_R$.

A block matrix $V_\Delta'$ is expressed by the following expression (6).

$$V_\Delta' = [v_1 v_2 \ldots v_r] \tag{6}$$

In the expression (5), $c_k$ denotes a weighting (complex) coefficient to be multiplied to the k-th weight $v_k$ and c denotes a complex vector composed of an r number of weighting coefficients. Especially, the first weight $v_1$ corresponds to the maximum singular value $c_1$ and hence forms the directivity that gives the maximum power supply efficiency. Therefore, in view of simply aiming at the maximum power supply efficiency, it is desirable to set only the weighting coefficient $c_1$, which corresponds to the first weight $v_1$, to a finite value and the other coefficients to 0.

However, among the plurality of power receivers 4, in the "case where there are power receivers 4 isolated in position", "case where there are power receivers 4 apart in distance", etc., the first weight $v_1$ may form the directivity for power supply preferentially to "a plurality of power receivers 4 that exist together" or "power receivers 4 close to the power transmitter 3 in distance". As a result, power is not supplied enough to the "power receivers 4 isolated in position", the "power receivers 4 apart in distance", etc., and hence it is difficult to satisfy the requested power of these power receivers 4.

If there is deviation in magnitude of the requested power of the power receivers 4, the first weight $v_1$ may not always form directivity in view of the deviation in magnitude of the requested power. It is therefore, using weights other than the first weight $v_1$, the phase and amplitude are controlled based on the weight obtained by appropriate weighting composition of those weights to form directivity of a beam pattern that simultaneously satisfies the requested power of the plurality of power receivers 4 (a broken-line frame w4 in FIG. 12).

In the above-described method, the number of weighting coefficients $c_k$ that are required to be set is r ($r \leq N_R \leq N_T$). Therefore, by the above-described method, the combination of phase and amplitude can be found, which is much more effective and appropriate than by simply calculating the phases and amplitudes for the $N_T$ number of antennas of the power transmitter 3.

The weighting coefficient vector c may be calculated as follows. For example, the control policy shown in FIG. 11 can be interpreted as a constrained optimization problem having a purpose of "maximizing the entire system power supply efficiency" with a constraint of "supplying power that exceeds the requested power of the plurality of power receivers 4". Although, there are a plurality of methods to solve a constrained optimization problem, a "penalty method", which is one of the methods, may be used. Using the "penalty method", a constrained optimization problem can be converted into an unconstrained optimization problem, by defining a new objective function by adding a term "penalty" of a constraint function to the original objective function.

An objective function f(c) can be defined as the following expression (7) with the above-described weighting coefficient vector c as a variable.

$$f(c) = \frac{1}{\sigma_1^2} \cdot \frac{c^H \Delta^2 c}{c^H c} \tag{7}$$

In the expression (7), the latter term corresponds to the entire system power supply efficiency in the case of power supply using the weight shown in the expression (5). As described above, since the maximum power supply efficiency to be achieved in the propagation path discussed here is given by squaring the first singular value $\alpha 1$, the objective function f(c) of the expression (7) takes the value of 0 to 1.

Subsequently, concerning the constraint function, power $p_i$ to be received by the i-th power receiver 4 using the weight shown in the expression (5) is expressed by the following expression (8).

$$p_i = c_H V_\Delta'^H h_i^H h_i V_\Delta' c \tag{8}$$

where $h_i$ denotes a transmission path vector to the i-th power receiver 4, in the transmission path matrix H. A constraint function $g_i$ to the i-th power receiver 4 can be defined as the following expression (9).

$$g_i(c) = \begin{cases} 0 & (p_{min,i} \le p_i) \\ \left(1 - \dfrac{p_i}{p_{min,i}}\right)^2 & (p_{min,i} > p_i) \end{cases} \quad (9)$$

In the expression (9), $P_{min,i}$ expresses the requested power of the i-th power receiver 4. A constraint function $g_i$ to the i-th power receiver 4 take a value of 0 when the received power is equal to or larger than the requested power ($p_{min,i} \le p_i$), whereas when the received power is smaller than the requested power ($p_{min,i} > p_i$), a value is $(1-p_i/p_{min,i})^2$, where the value is from 0 to 1.

From the objective function in the expression (7) and the constraint function in the expression (9), a new objective function $\phi(c)$ can be defined as the following expression (10).

$$\phi(c) = f(c) - \mu \sum_{i=1}^{N_R} g_i(c) \quad (10)$$

The new objective function $\phi(c)$ in the expression (10) is given by subtracting the total sum of the constraint function $g_i$, which is multiplied by a penalty coefficient, from the original objective function f(c). An approximate solution of the original constrained optimization problem is equivalently obtained by maximizing $\phi(c)$. In practice, initially, $\mu$ is set to a small value (such as, 1) and is updated (usually, exponentiation of 10) when an optimum solution of $\phi(c)$ is obtained, and then the optimum solution of $\phi$ after $\mu$ is updated is calculated again. The above calculation is repeated until the term of the constraint function becomes close to zero as much as possible. Since the new objective function $\phi(c)$ becomes a function that can be differentiated by a variable c, optimization may be performed using a gradient method.

As described above, in the first embodiment, based on the propagation path information estimated at the power transmitter 3 or the plurality of power receivers 4 and on the requested-power information of the plurality of power receivers 4, the power value to be transmitted by the power transmitter 3 is set and also at least either one of the phase and amplitude of power to be supplied to the plurality of first antennas 11 is set. In this way, power equal to or larger than the requested power is supplied to the plurality of power receivers 4 simultaneously and the entire system power supply efficiency is improved.

Second Embodiment

A purpose of a second embodiment is to minimize the power to be transmitted.

Figure 13:
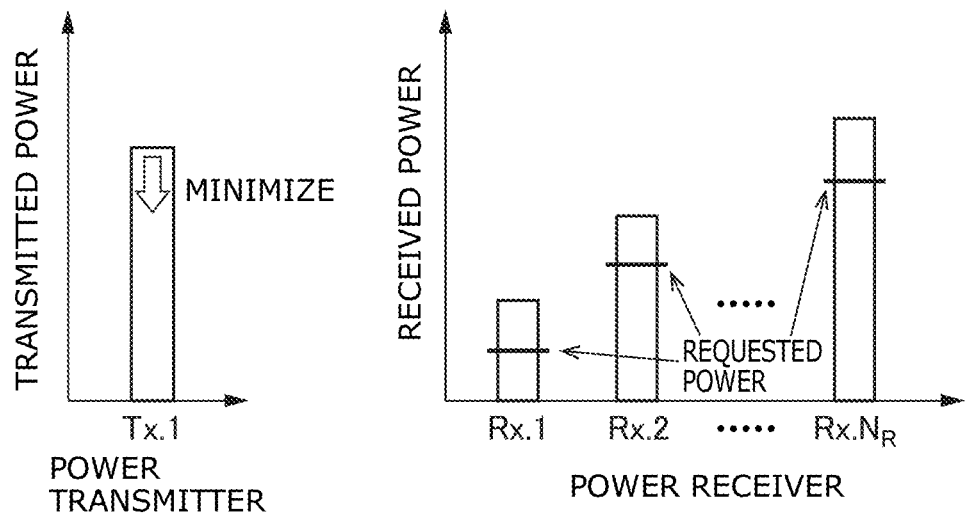
FIG. 13 is a drawing showing a control policy of a wireless power supply system according to a second embodiment.

FIG. 13 is a drawing showing a control policy of a wireless power supply system 1 according to the second embodiment. In the second embodiment, so that the power received by each power receiver 4 exceeds the requested power and the transmitted power becomes minimum, the power value to be transmitted by the power transmitter 3 is set and also at least either one of the phase and amplitude of power to be supplied to the plurality of first antennas 11 is set.

It is preferable in wireless power supply to minimize the power to be transmitted in view of power saving and reduction of interference. It is therefore in the present embodiment, each parameter may be set based on the solution of a constrained optimization problem, having a purpose of minimizing the power to be transmitted, with a constraint on supply of power exceeding the requested power of the plurality of power receivers 4. For example, power to be transmitted $P_T$ using the weight shown in the expression (5) is expressed by the following expression (11). The expression (11) may be used as an objective function.

$$P_T = c_H c \quad (11)$$

It is not practically easy to set the total power to be transmitted by the power transmitter 3 to the minimum value. In practice, the total power to be transmitted by the power transmitter 3 is set to a value larger than the minimum value. Accordingly, the control unit 6 controls the total power to be transmitted by the power transmitter 3 to be equal to or smaller than a value acquired by multiplying the minimum value of power to be transmitted by the power transmitter 3 by the number of the plurality of power receivers 4. The multiplication of the minimum value of power to be transmitted by the power transmitter 3 by the number of the plurality of power receivers 4 gives a margin by the number of the power receivers 4 to the minimum value of power to be transmitted by the power transmitter 3. By controlling the power to be transmitted to be equal to or smaller than the value acquired by the above multiplication, it is achieved to minimize the power to be transmitted by the power transmitter 3 as much as possible.

As described above, in the second embodiment, so that the transmitted power is minimized as much as possible and the received power exceeds the requested power of each power receiver 4, the power value to be transmitted by the power transmitter 3 is set and also at least either one of the phase and amplitude of power to be supplied to the plurality of first antennas 11 is set. Therefore, power saving is achieved while the power equal to or larger than the requested power is being supplied to each power receiver 4.

Third Embodiment

A purpose of a third embodiment is to maximize the power supply efficiency and minimize the transmitted power.

Figure 14:
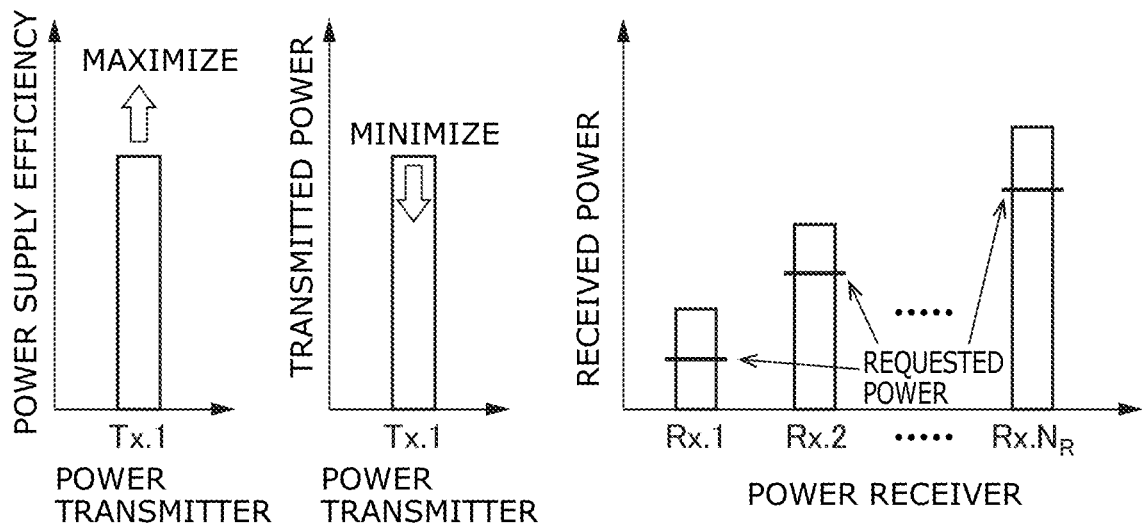
FIG. 14 is a drawing showing a control policy of a wireless power supply system according to a third embodiment.

FIG. 14 is a drawing showing a control policy of a wireless power supply system 1 according to the third embodiment. In the third embodiment, so that the power received by each power receiver 4 exceeds the requested power, the entire system power supply efficiency becomes maximum, and the transmitted power becomes minimum, the power value to be transmitted by the power transmitter 3 is set and also at least either one of the phase and amplitude of power to be supplied to the plurality of first antennas 11 is set.

In wireless power supply, it is desirable to improve the entire system power supply efficiency and reduce the power to be transmitted by the power transmitter 3. With the same method as in the first embodiment, if the power value to be transmitted by the power transmitter 3 and at least either one of the phase and amplitude of power to be supplied to the plurality of first antennas 11 are set in order to achieve the maximum entire system power supply efficiency, the power to be received by each power receiver 4 may be equal to or larger than the requested power. Here, the ratio of the requested power to the power to be received by each power receiver 4 is obtained and the highest ratio among the ratios obtained for the plurality of power receiver 4 is defined as the reduction rate. If it is assumed that the power to be received is simply in proportion to the power to be transmitted, even if the power to be transmitted is reduced to the value acquired by multiplying the power to be transmitted by the reduction rate, the power to be received by each power receiver 4 is considered to exceed the requested power. Therefore, the control unit 6 in the present embodiment controls the power to be transmitted by the power transmitter 3 to be reduced to a value acquired by multiplying the power to be transmitted before being reduced by the reduction rate. In this way, it is achieved to maximize the power supply efficiency and minimize the transmitted power, while supplying power equal to or larger than the requested power to each power receiver 4.

As described above, in the third embodiment, so that power equal to or larger than the requested power is supplied to each power receiver 4 and the power supply efficiency is raised as much as possible, and the power to be transmitted is reduced as much as possible, the power to be transmitted by the power transmitter 3 is set and also at least either one of the phase and amplitude of power to be supplied to the plurality of first antennas 11 is set. In this way, it is achieved, not only to satisfy the requested power of the power receiver 4, but also to maximize the power supply efficiency and to minimize the power to be transmitted.

Fourth Embodiment

A fourth embodiment is to set an upper limit to the power to be transmitted by the power transmitter 3.

Figure 15:
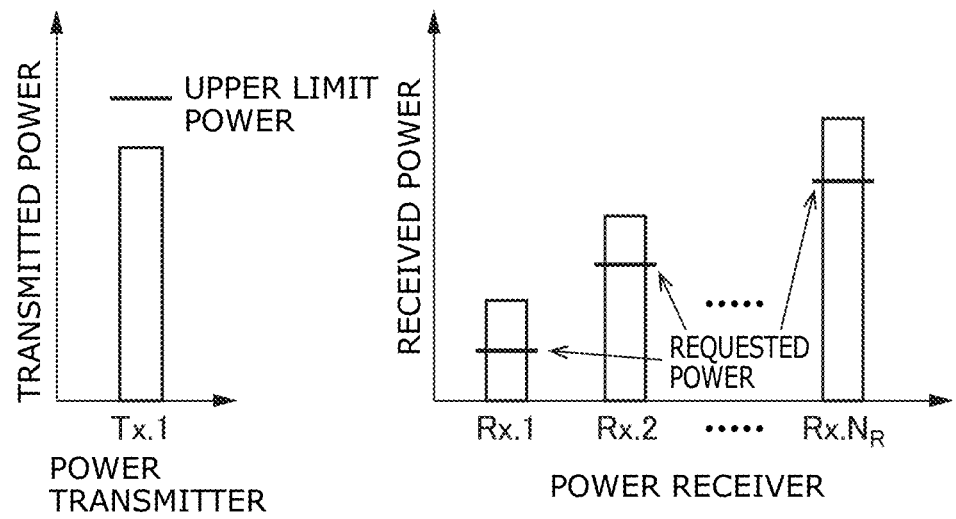
FIG. 15 is a drawing showing a control policy according to a fourth embodiment.

FIG. 15 is a drawing showing a control policy according to the fourth embodiment. In the present embodiment, an upper limit of the power to be transmitted is set, and the power value to be transmitted by the power transmitter 3 is set, and also at least either one of the phase and amplitude of power to be supplied to the plurality of first antennas 11 is set, within a range not exceeding the upper limit. In radio-wave type wireless power supply, there is a restriction on the power to be transmitted itself or equivalent isotropic radiated power, which has to be fulfilled. Therefore, the control unit 6 in the present embodiment set the above-mentioned parameters to appropriate values based on the solution of a constrained optimization problem having the upper limit of the power to be transmitted and the requested power of each power receiver 4 as constraint functions. For example, power to be transmitted $P_T$ using the weight shown in the expression (5) is given by the expression (11) and when the upper limit of the power to be transmitted is denoted as $P_{T,max}$, a constraint function $g_T(c)$ related to the power to be transmitted is defined as the following expression (12).

$$g_T(c) = \begin{cases} 0 & P_T \leq P_{T,max} \\ \left(1 - \dfrac{P_{T,max}}{P_T}\right)^2 & P_T > P_{T,max} \end{cases} \quad (12)$$

In the expression (12), the constraint function $g_T(c)$ related to the power to be transmitted takes a value of 0 when the power to be transmitted is equal to or smaller than the upper limit value of the power to be transmitted ($p_T \leq p_{T,max}$), whereas when the power to be transmitted is larger than the upper limit value of the power to be transmitted ($p_T > p_{T,max}$), a value is $(1-p_{T,max}/p_T)^2$, where the value is from 0 to 1.

As described above, in the fourth embodiment, so that the power received by each power receiver 4 exceeds the requested power and the power to be transmitted by the power transmitter 3 does not exceed the upper limit, the power to be transmitted by the power transmitter 3 is set and also at least either one of the phase and amplitude of power to be supplied to the plurality of first antennas 11 is set. In this way, the power received by each power receiver 4 does not fall below the requested power and the power to be transmitted by the power transmitter 3 does not exceed the upper limit.

Fifth Embodiment

A fifth embodiment is not to allow the power received by each power receiver 4 to exceed an allowable power to be received.

Figure 16:
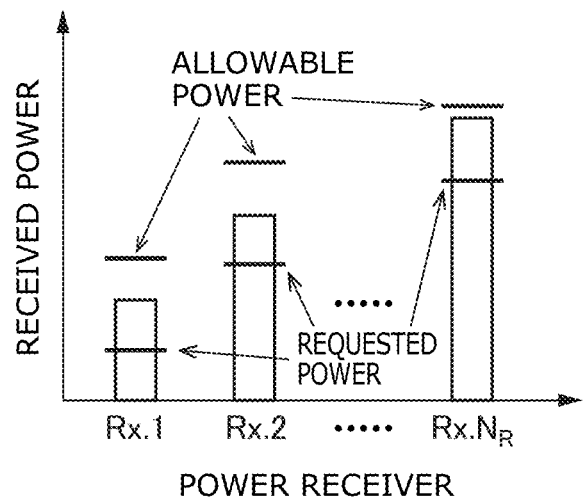
FIG. 16 is a drawing showing a control policy according to a fifth embodiment.

FIG. 16 is a drawing showing a control policy according to the fifth embodiment. The control unit 6 in the present embodiment sets an allowable power to be received to each power receiver 4. And, so that the power received by each power receiver 4 does not exceed the allowable power to be received, the control unit 6 sets the power value to be transmitted by the power transmitter 3 and at least either one of the phase and amplitude of power to be supplied to the plurality of first antennas 11.

The rectifier 23 inside each power receiver 4 is configured with circuit components such as transistors. The circuit components have an input-voltage rate value. If the input voltage exceeds the rate value, it causes saturation of performance, breakdown of the circuit components, etc. In the present embodiment, the above-mentioned parameters are set to be appropriate values based on the solution of a constrained optimization problem having the allowable power to be received and the requested power of each power receiver 4 as constraint functions. A constraint function related to the allowable power to be received can be defined in the same format as the expressions (9) and (12).

As described above, in the fifth embodiment, so that the power received by each power receiver 4 exceeds the requested power and the power received by each power receiver 4 does not exceed the allowable power to be received, the power value to be transmitted by the power transmitter 3 is set and also at least either one of the phase and amplitude of power to be supplied to the plurality of first antennas 11 is set. In this way, each power receiver 4 is protected from degradation of electrical characteristics, breakdown, etc.

Sixth Embodiment

The control policies explained in the above-described first to fifth embodiments can be combined in any way. For example, FIG. 17 shows a combination of the control policies of the fourth and fifth embodiments, to set an upper limit to the power to be transmitted by the transmitter 3 and to perform control so that the power received by each power receiver 4 does not exceed the allowable power to be received.

Figure 17:
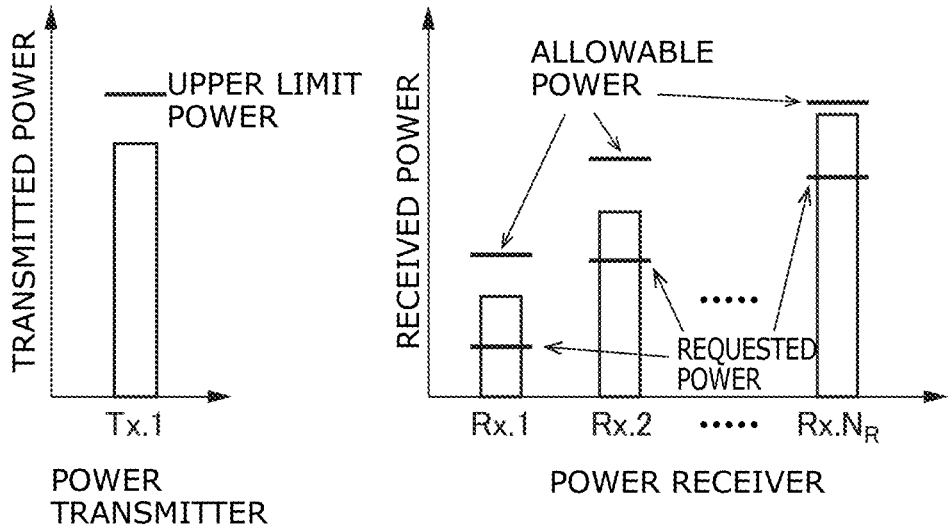
FIG. 17 shows a combination of the control policies of the fourth and fifth embodiments.

According to the control policy of FIG. 17, so that the power received by each power receiver 4 exceeds the requested power, the power transmitted by the power transmitter 3 does not exceed the upper limit, and the power received by each power receiver 4 does not exceed the allowable power to be received, it may be possible to set the power value to be transmitted by the power transmitter 3 and also set at least either one of the phase and amplitude of power to be supplied to the plurality of first antennas 11.

Figure 18:
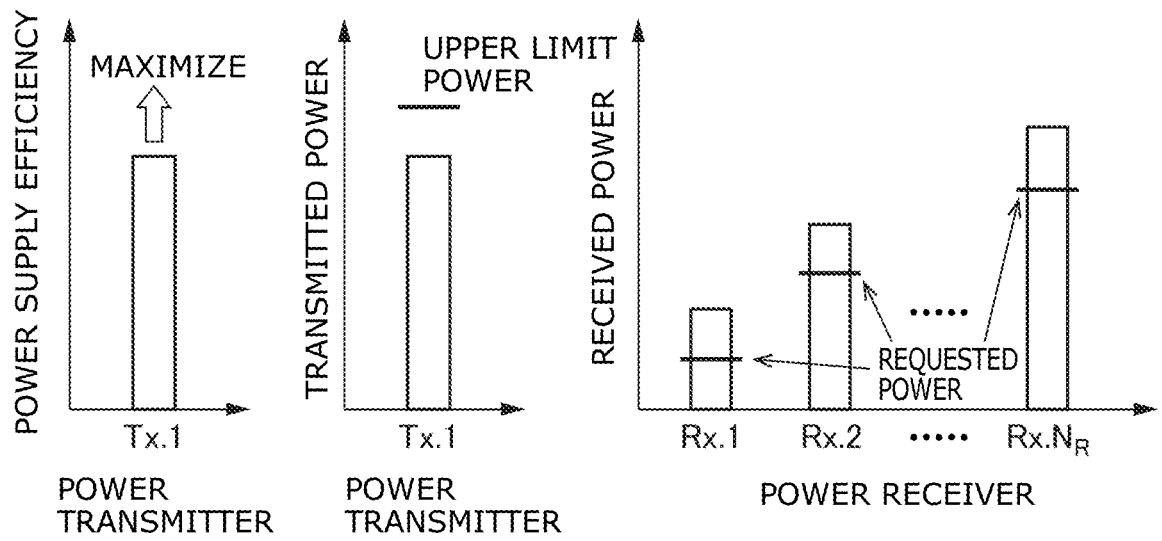
FIG. 18 shows a combination of the control policies of the first and fourth embodiments.

FIG. 18 shows a combination of the control policies of the first and fourth embodiments. According to the control policy of FIG. 18, so that the power received by each receiver 4 exceeds the requested power, the entire system power supply efficiency becomes highest, and the power transmitted by the power transmitter 3 does not exceed the upper limit, it may be possible to set the power value to be transmitted by the power transmitter 3 and also set at least either one of the phase and amplitude of power to be supplied to the plurality of first antennas 11.

Figure 19:
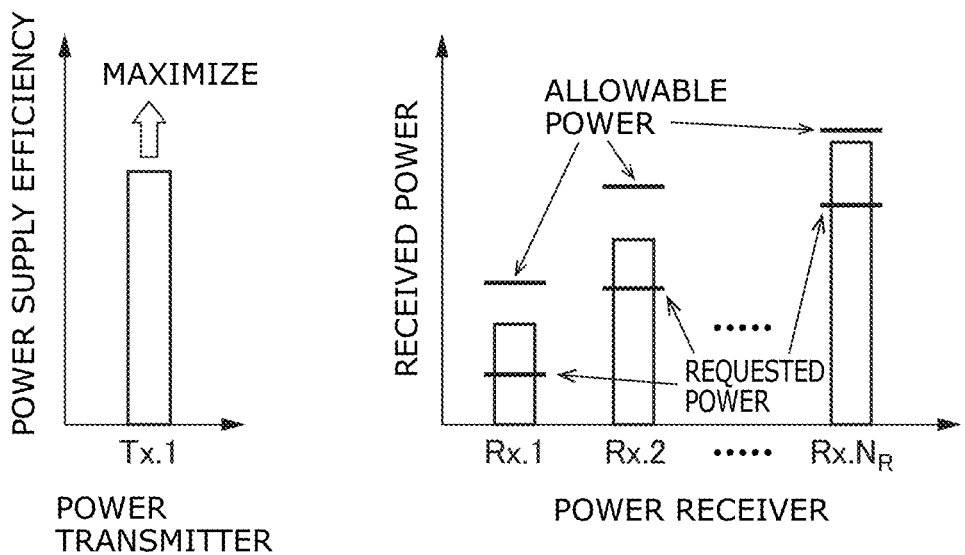
FIG. 19 shows a combination of the control policies of the first and fifth embodiments.

FIG. 19 shows a combination of the control policies of the first and fifth embodiments. According to the control policy of FIG. 19, so that the power received by each power receiver 4 exceeds the requested power, the entire system power supply efficiency becomes highest, and the power received by each power receiver 4 does not exceed the allowable power to be received, it may be possible to set the power value to be transmitted by the power transmitter 3 and also set at least either one of the phase and amplitude of power to be supplied to the plurality of first antennas 11.

Figure 20:
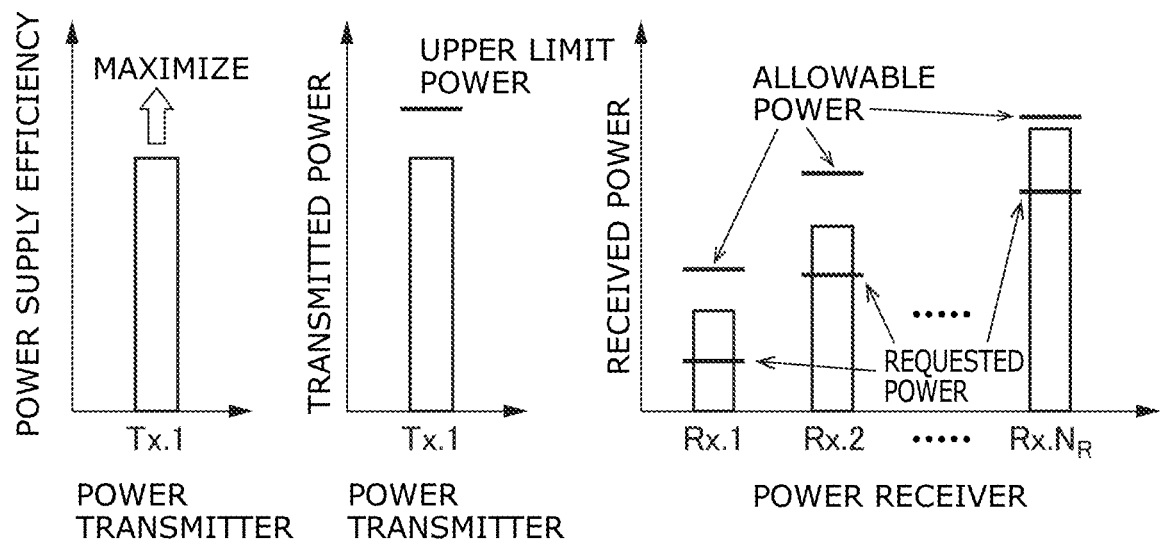
FIG. 20 shows a combination of the control policies of the first, fourth and fifth embodiments.

FIG. 20 shows a combination of the control policies of the first, fourth and fifth embodiments. According to the control policy of FIG. 20, so that the power received by each power receiver 4 exceeds the requested power, the entire system power supply efficiency becomes highest, the power transmitted by the power transmitter 3 does not exceed the upper limit, and the power received by each power receiver 4 does not exceed the allowable power to be received, it may be possible to set the power value to be transmitted by the power transmitter 3 and also set at least either one of the phase and amplitude of power to be supplied to the plurality of first antennas 11.

Figure 21:
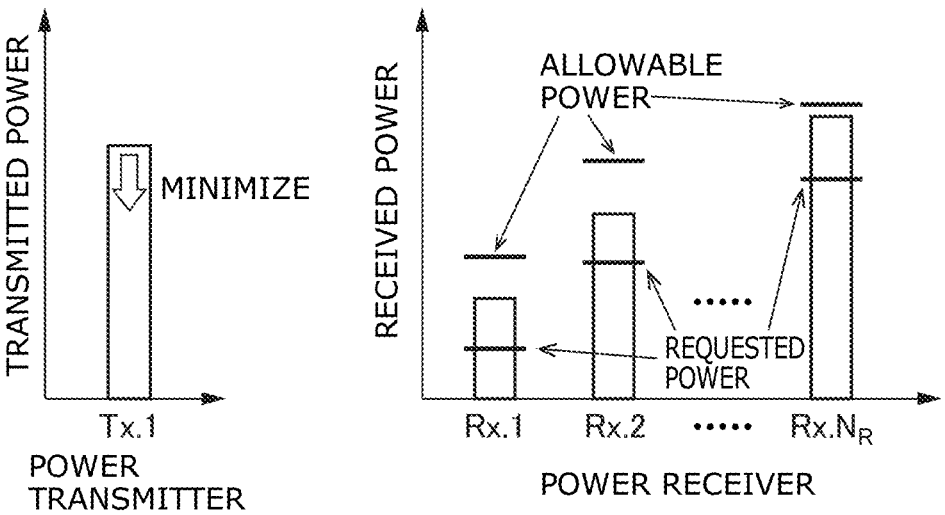
FIG. 21 shows a combination of the control policies of the second and fifth embodiments.

FIG. 21 shows a combination of the control policies of the second and fifth embodiments. According to the control policy of FIG. 21, so that the power received by each power receiver 4 exceeds the requested power, the power transmitted by the power transmitter 3 becomes minimum, and the power received by each power receiver 4 does not exceed the allowable power to be received, it may be possible to set the power value to be transmitted by the power transmitter 3 and also set at least either one of the phase and amplitude of power to be supplied to the plurality of first antennas 11.

Figure 22:
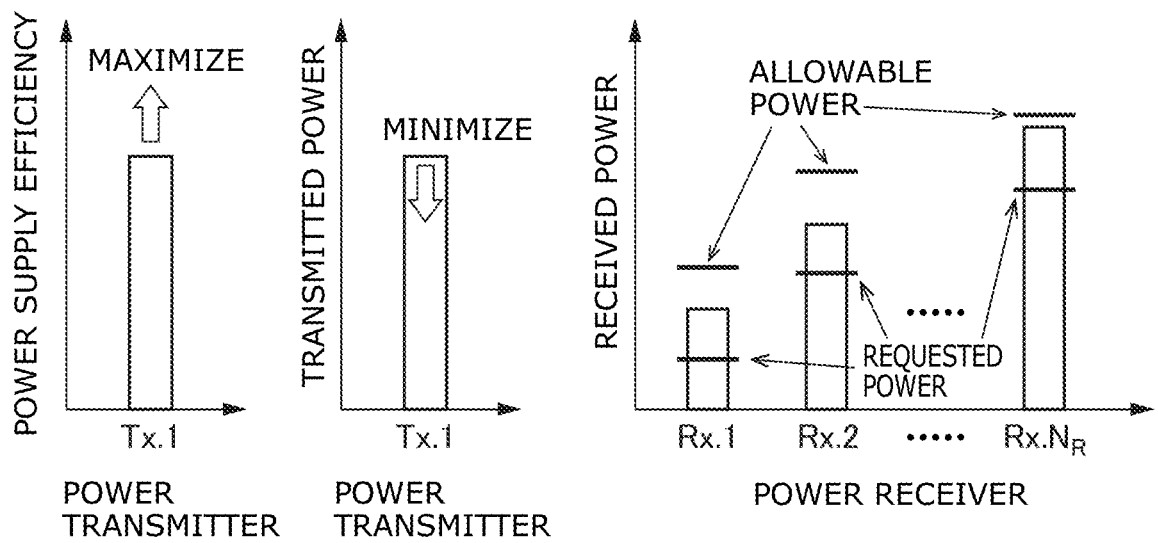
FIG. 22 shows a combination of the control policies of the first, second and fifth embodiments.

FIG. 22 shows a combination of the control policies of the first, second and fifth embodiments. According to the control policy of FIG. 22, so that the power received by each power receiver 4 exceeds the requested power, the entire system power supply efficiency becomes highest, the power transmitted by the power transmitter 3 becomes minimum, and the power received by each power receiver 4 does not exceed the allowable power to be received, it may be possible to set the power value to be transmitted by the power transmitter 3 and also set at least either one of the phase and amplitude of power to be supplied to the plurality of first antennas 11.

As described above, based on the control policy that is the combination of the control policies of any of the first to fifth embodiments, it may be possible to set the power value to be transmitted by the power transmitter 3 and also set at least either one of the phase and amplitude of power to be supplied to the plurality of first antennas 11.

Seventh Embodiment

A seventh embodiment is to maximize the power to be received by one or more power receivers 4.

Figure 23:
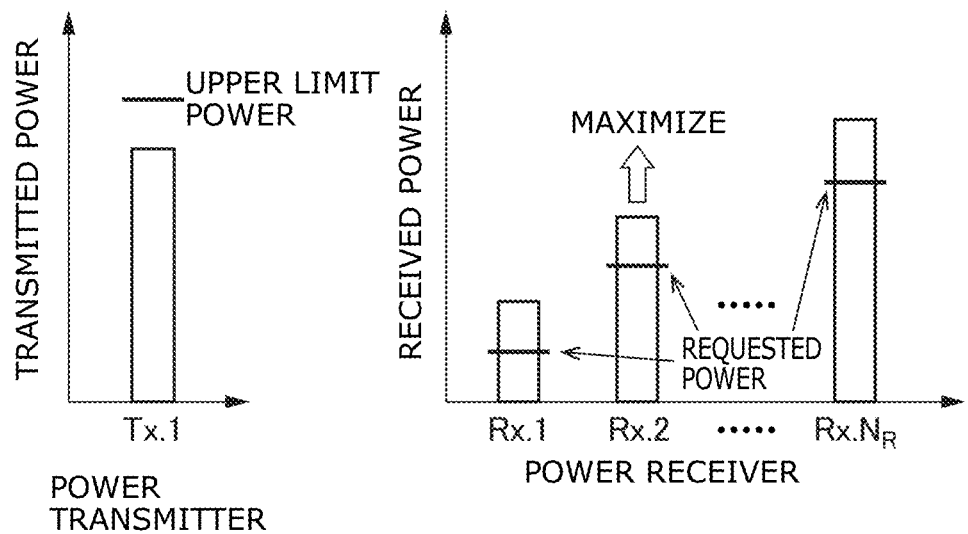
FIG. 23 is a drawing showing a control policy according to a seventh embodiment.

FIG. 23 is a drawing showing a control policy according to the seventh embodiment. In accordance with the control policy of FIG. 23, so that the power received by each power receiver 4 exceeds the requested power, the power transmitted by the power transmitter 3 does not exceed the upper limit, and the power received by one or more power receivers 4 becomes maximum, the control unit 6 controls the power value to be transmitted by the power transmitter 3 and at least either one of the phase and amplitude of power to be supplied to the plurality of first antennas 11.

The power receivers 4 require larger power when the remaining charged power is extremely small or the consumed power is extremely large. Accordingly, in the present embodiment, the above-mentioned parameters can be set to appropriate values based on the solution of a constrained optimization problem having the power to be received as an objective function, and the upper limit of the power to be transmitted and the allowable power to be received as constraint functions. For example, the power value to be received by the i-th power receiver 4 given by the expression (8) may be used as an objective function. If the power to be received by each of the plurality of power receivers 4 is required to be maximum, a total sum of the power to be received at a proper ratio may be used as the objective function.

It is practically very difficult to determine whether the power to be received by each of the plurality of power receivers 4 is maximum. For this reason, so that the power to be received by each of the plurality of power receivers 4 is equal to or larger than a value acquired by dividing the maximum receivable power of the plurality of power receivers 4 by the number of plurality of power receivers 4, the control unit 6 may control the power value to be transmitted by power transmitter 3 and also at least either one of the phase or the amplitude of power supplied to the plurality of first antennas.

Figure 24:
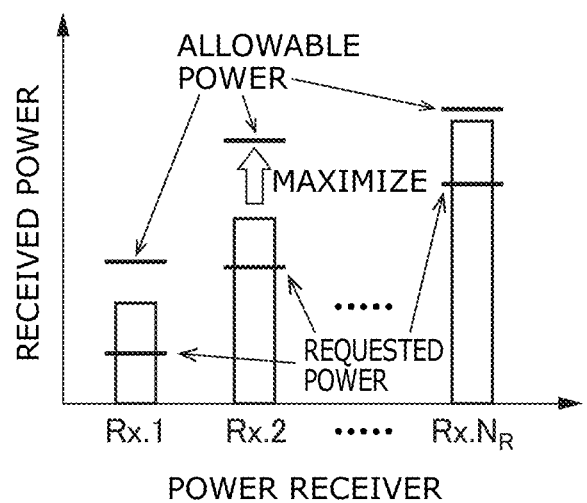
FIG. 24 is a drawing showing a control policy of a first modification of the seventh embodiment.

FIG. 24 is a drawing showing a control policy of a first modification of the seventh embodiment. In accordance with the control policy of FIG. 24, so that the power received by each power receiver 4 exceeds the requested power, the power received by each power receiver 4 does not exceed the allowable power to be received, and the power received by one or more power receivers 4 becomes maximum, the control unit 6 controls the power value to be transmitted by the power transmitter 3 and at least either one of the phase and amplitude of power to be supplied to the plurality of first antennas 11.

Figure 25:
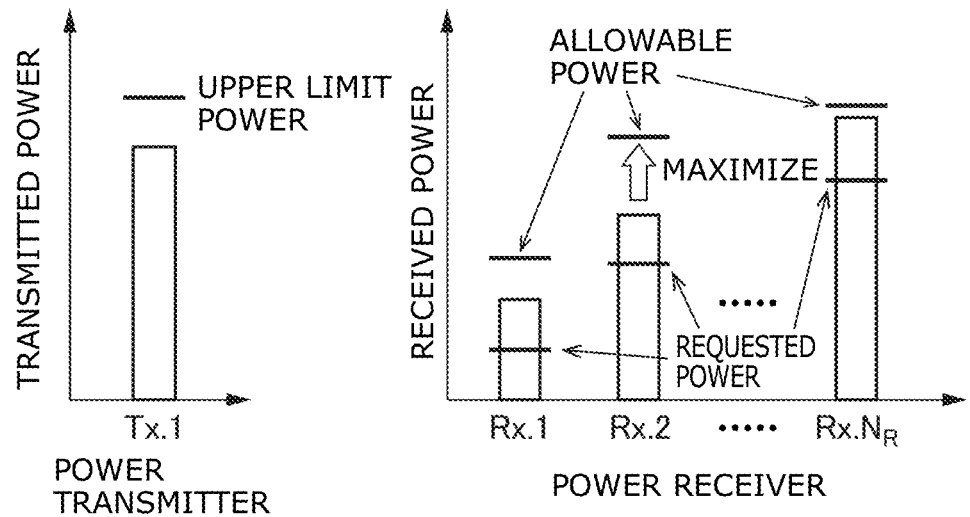
FIG. 25 is a drawing showing a control policy of a second modification of the seventh embodiment.

FIG. 25 is a drawing showing a control policy of a second modification of the seventh embodiment. In accordance with the control policy of FIG. 25, so that the power received by each power receiver 4 exceeds the requested power, the power transmitted by the power transmitter 3 does not exceed the upper limit, the power received by each power receiver 4 does not exceed the allowable power to be received, and the power received by one or more power receivers 4 becomes maximum, the control unit 6 controls the power value to be transmitted by the power transmitter 3 and at least either one of the phase and amplitude of power to be supplied to the plurality of first antennas 11.

As described above, in the seventh embodiment, so that the power received by one or more power receivers 4 becomes maximum, the power value to be transmitted by the power transmitter 3 is set and also at least either one of the phase and amplitude of power to be supplied to the plurality of first antennas 11 is set. Therefore, more power can be supplied to a power receiver 4 that consumes larger power.

Eighth Embodiment

An eighth embodiment is to adopt a control policy that is a combination of the control policies of the first to seventh embodiments.

Figure 26:
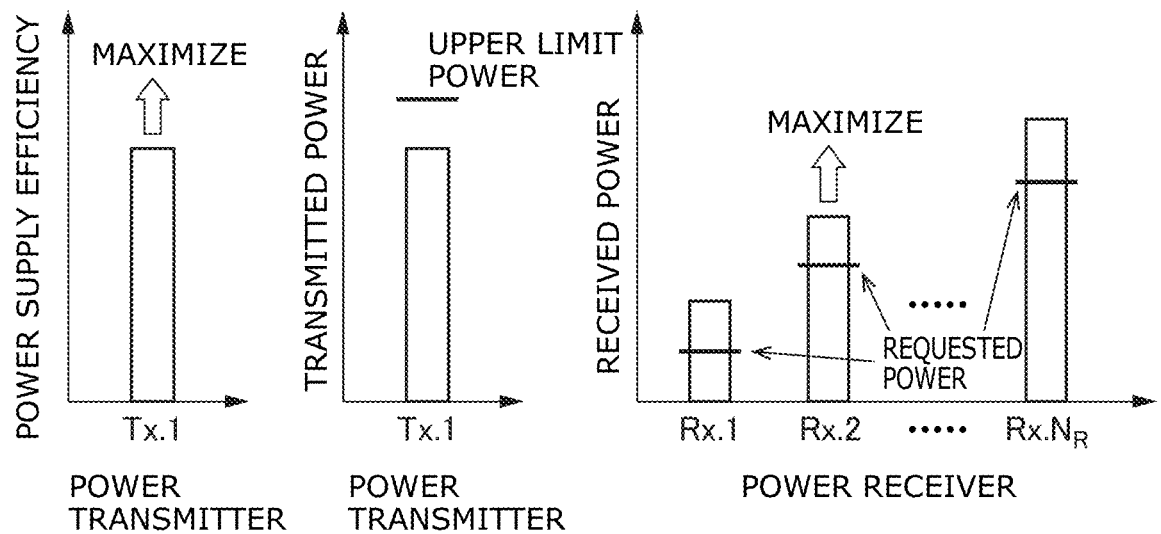
FIG. 26 is a drawing showing a control policy according to an eighth embodiment.

FIG. 26 is a drawing showing a control policy according to the eighth embodiment. In accordance with the control policy of FIG. 26, so that the power received by each power receiver 4 exceeds the requested power, the entire system supply efficiency becomes highest, the power transmitted by the power transmitter 3 does not exceed the upper limit, and the power received by one or more power receivers 4 becomes maximum, the control unit 6 controls the power value to be transmitted by the power transmitter 3 and at least either one of the phase and amplitude of power to be supplied to the plurality of first antennas 11.

Figure 27:
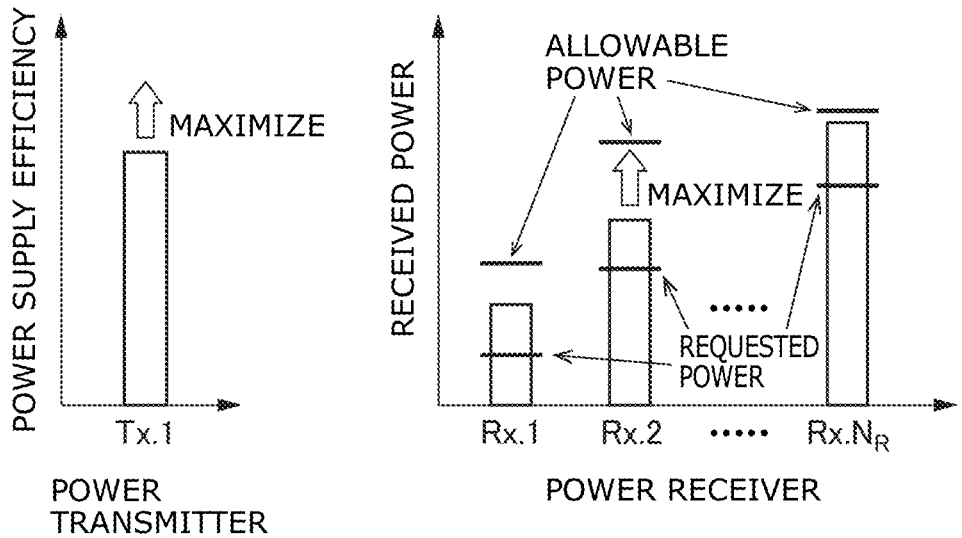
FIG. 27 is a drawing showing a control policy of a first modification of the eighth embodiment.

FIG. 27 is a drawing showing a control policy of a first modification of the eighth embodiment. In accordance with the control policy of FIG. 27, so that the power received by each power receiver 4 exceeds the requested power, the entire system supply efficiency becomes highest, the power received by each power receiver 4 does not exceed the allowable power to be received, and the power received by one or more power receivers 4 becomes maximum, the control unit 6 controls the power value to be transmitted by the power transmitter 3 and at least either one of the phase and amplitude of power to be supplied to the plurality of first antennas 11.

Figure 28:
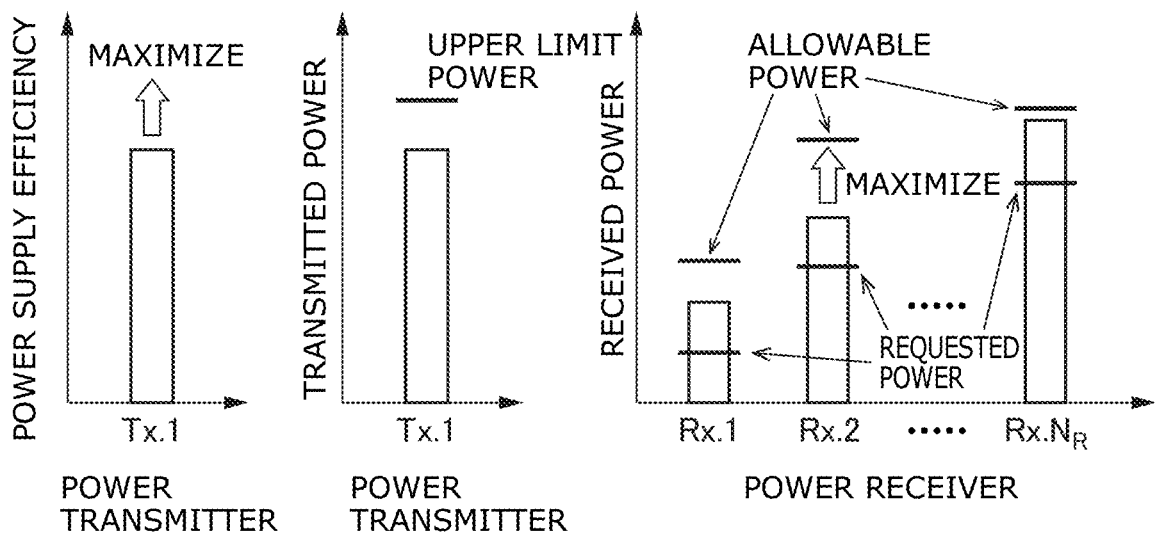
FIG. 28 is a drawing showing a control policy of a second modification of the eighth embodiment.

FIG. 28 is a drawing showing a control policy of a second modification of the eighth embodiment. In accordance with the control policy of FIG. 28, so that the power received by each power receiver 4 exceeds the requested power, the entire system supply efficiency becomes highest, the power transmitted by the power transmitter 3 does not exceed the upper limit, the power received by each power receiver 4 does not exceed the allowable power to be received, and the power received by one or more power receivers 4 becomes maximum, the control unit 6 controls the power value to be transmitted by the power transmitter 3 and at least either one of the phase and amplitude of power to be supplied to the plurality of first antennas 11.

FIGS. 26 to 28 each show an example of the combination of the control policies of the first to seventh embodiments. The control policies of the first to seventh embodiments may be combined in any way.

FIG. 1 shows an example in which the controller 2 is provided separately from the power transmitter 3 and the power receiver 4. However, the controller 2 may be installed in the power transmitter 3 or the power receiver 4.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A wireless power-supply control apparatus to perform control on transmission of power from at least one power transmitter including a plurality of antennas to a plurality of power receivers, the wireless power-supply control apparatus comprising:

a communicator to receive propagation path information between the at least one power transmitter and the plurality of power receivers and requested-power information on requested power of the plurality of power receivers, from the at least one power transmitter or the plurality of power receivers; and a controller to control power to be transmitted from the at least one power transmitter to a predetermined value and control at least either one of a phase or an amplitude of power to be supplied to the plurality of antennas, based on the propagation path information and the requested-power information, so that a specific number of power receivers of the plurality of power receivers receiving power larger than the requested power is equal to or larger than a predetermined number, wherein, based on an orthonormal basis matrix acquired by decomposing a transmission-path matrix created from the propagation path information, the controller controls the power to be transmitted from the at least one power transmitter to the predetermined value and controls at least either one of the phase or the amplitude of power to be supplied to the plurality of antennas.

2. The wireless power-supply control apparatus according to claim 1, wherein, so that a ratio of a total sum of power to be received by the plurality of power receivers to a total power to be transmitted from the at least one power transmitter is equal to or larger than a value acquired by dividing a maximum value of the ratio by the specific number of the plurality of power receivers, and power received by the plurality of power receivers exceeds the requested power of the plurality of power receivers simultaneously for the plurality of power receivers, the controller controls the power to be transmitted from the at least one power transmitter to the predetermined value and at least either one of the phase or the amplitude of power to be supplied to the plurality of antennas.

3. The wireless power-supply control apparatus according to claim 1, wherein, based on an orthonormal basis contributing to supply efficiency in the transmission-path matrix, the controller controls the power to be transmitted from the at least one power transmitter to the predetermined value and controls at least either one of the phase or the amplitude of power to be supplied to the plurality of antennas.

4. The wireless power-supply control apparatus according to claim 3, wherein, based on an orthonormal basis in the transmission-path matrix after removing an orthonormal basis not contributing to supply efficiency, the controller controls the power to be transmitted from the at least one power transmitter to the predetermined value and controls at least either one of the phase or the amplitude of power to be supplied to the plurality of antennas.

5. The wireless power-supply control apparatus according to claim 1, wherein, so that total power transmitted by the at least one power transmitter is equal to or smaller than a value acquired by multiplying a minimum value of power transmitted by the at least one power transmitter by a specific number of the plurality of power receivers and power received by the plurality of power receivers exceeds the requested power of the plurality of power receivers simultaneously for the plurality of power receivers, the controller controls the power to be transmitted from the at least one power transmitter to the predetermined value and controls at least either one of the phase or the amplitude of power to be supplied to the plurality of antennas.

6. The wireless power-supply control apparatus according to claim 5, wherein the minimum value of the power to be transmitted is a value obtained by minimizing the power to be transmitted as an objective function, the power to be transmitted being expressed as $PT=cHc$, where "PT" is the power to be transmitted, "c" is a weighting coefficient, and H expresses a complex conjugate transpose of a matrix.

7. The wireless power-supply control apparatus according to claim 1, wherein, so that total power transmitted by the at least one power transmitter does not exceed a predetermined threshold value and power to be received by the plurality of power receivers exceeds the requested power of the plurality of power receivers simultaneously for the plurality of power receivers, the controller controls the power to be transmitted from the at least one power transmitter to the predetermined value and controls at least either one of the phase or the amplitude of power to be supplied to the plurality of antennas.

8. The wireless power-supply control apparatus according to claim 1, wherein, if a power receiver having an allowable limit value decided is present in the plurality of power receivers, in order not to exceed the allowable limit value and in order that power to be received by the plurality of power receivers exceeds the requested power of the plurality of power receivers simultaneously for the plurality of power receivers, the controller controls the power to be transmitted from the at least one power transmitter to the predetermined value and controls at least either one of the phase or the amplitude of power to be supplied to the plurality of antennas.

9. The wireless power-supply control apparatus according to claim 1, wherein, so that power to be received by at least one power receiver among the plurality of power receivers is equal to or larger than a value obtained by dividing a maximum receivable power at the one power receiver by the specific number of the plurality of power receivers and power to be received by the plurality of power receivers exceeds the requested power of the plurality of power receivers simultaneously for the plurality of power receivers, the controller the power to be transmitted from the at least one power transmitter to the predetermined value and controls at least either one of the phase or the amplitude of power to be supplied to the plurality of antennas.

10. A power transmitter comprising:
   a plurality of antennas;
   a first communicator to perform communication with a wireless power-supply control apparatus and to process a signal transmitted and received via the plurality of antennas, the wireless power supply control apparatus being to perform control on transmission of power from the power transmitter to a plurality of power receivers and including:
      a second communicator to receive propagation path information between the power transmitter and the plurality of power receivers and requested-power information on requested power of the plurality of power receivers, from the power transmitter or the plurality of power receivers; and
      a controller to control power to be transmitted from the power transmitter to a predetermined value and control at least either one of a phase or an amplitude of power to be supplied to the plurality of antennas, based on the propagation path information and the requested-power information, so that a specific number of power receivers of the plurality of power receivers receiving power larger than the requested power is equal to or larger than a predetermined number;
   a power source to, based on a control signal from the controller, generate power to be transmitted having the predetermined value;
   a distributor to distribute the power generated by the power source toward the plurality of antennas;
   a variable phase shifter to, based on the control signal from the controller, set the phase of power to be supplied to the plurality of antennas; and
   a variable amplifier to, based on the control signal from the controller, set the amplitude of power to be supplied to the plurality of antennas,
   wherein, based on an orthonormal basis matrix acquired by decomposing a transmission-path matrix created from the propagation path information, the controller controls the power to be transmitted from the power transmitter to the predetermined value and controls at least either one of the phase or the amplitude of power to be supplied to the plurality of antennas.

11. The power transmitter of claim 10, further comprising a propagation path detector to detect information on propagation paths with the plurality of receivers, based on a reference signal received from the plurality of receivers via the plurality of antennas and the first communicator,
   wherein the first communicator transmits the information on propagation paths to the wireless power-supply control apparatus.

12. A power receiver comprising:
   a first communicator to perform communication with a wireless power-supply control apparatus, the wireless-power supply control apparatus to perform control on transmission of power from at least one power transmitter including a plurality of antennas to a plurality of power receivers including the power receiver and including:
      a second communicator to receive propagation path information between the at least one power transmitter and the plurality of power receivers and requested-power information on requested power of the plurality of power receivers, from the at least one power transmitter or the plurality of power receivers; and
      a controller to control power to be transmitted from the at least one power transmitter to a predetermined value and control at least either one of a phase or an amplitude of power to be supplied to the plurality of antennas, based on the propagation path information and the requested-power information, so that a specific number of power receivers of the plurality of power receivers receiving power larger than the requested power is equal to or larger than a predetermined number;
   an antenna to receive power transmitted from the at least one power transmitter; and
   a rectifier to rectify the power received by the antenna,
   wherein, based on an orthonormal basis matrix acquired by decomposing a transmission-path matrix created from the propagation path information, the controller controls the power to be transmitted from the at least one power transmitter to the predetermined value and controls at least either one of the phase or the amplitude of power to be supplied to the plurality of antennas.

13. The power receiver of claim 12, further comprising a propagation path detector to detect information on propagation paths with the plurality of receivers, based on a reference signal received from the at least one power transmitter via the antenna and the first communicator,
   wherein the first communicator transmits the information on propagation paths to the wireless power-supply control apparatus.

14. A method of controlling transmission of power from at least one power transmitter including a plurality of antennas to a plurality of power receivers, comprising:

receiving propagation path information between the at least one power transmitter and the plurality of power receivers and requested-power information on requested power of the plurality of power receivers, from the at least one power transmitter or the plurality of power receivers; and controlling power to be transmitted from the at least one power transmitter to a predetermined value and controlling at least either one of a phase or an amplitude of power to be supplied to the plurality of antennas, based on the propagation path information and the requested-power information, so that a specific number of power receivers receiving power larger than the requested power of the plurality of power receivers is equal to or larger than a predetermined number, based on an orthonormal basis matrix acquired by decomposing a transmission-path matrix created from the propagation path information, the controlling controls the power to be transmitted from the at least one power transmitter to the predetermined value and controls at least either one of the phase or the amplitude of power to be supplied to the plurality of antennas.

* * * * *